United States Patent
Inoue et al.

(10) Patent No.: US 7,393,299 B2
(45) Date of Patent: Jul. 1, 2008

(54) HYDRAULIC CONTROL APPARATUS AND HYDRAULIC CONTROL METHOD FOR AUTOMATIC TRANSMISSION

(75) Inventors: Yuji Inoue, Nisshin (JP); Atsushi Tabata, Okazaki (JP); Atsushi Honda, Seto (JP); Akiharu Abe, Toyota (JP); Kazutoshi Nozaki, Aichi-gun (JP); Hirofumi Ota, Toyota (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 11/396,459

(22) Filed: Apr. 4, 2006

(65) Prior Publication Data

US 2006/0252593 A1 Nov. 9, 2006

(30) Foreign Application Priority Data

May 9, 2005 (JP) ............................. 2005-136639

(51) Int. Cl.
*F16H 31/00* (2006.01)
(52) U.S. Cl. ..................................................... 475/123
(58) Field of Classification Search ................... 477/65; 192/3.63, 3.58; 475/123
See application file for complete search history.

(56) References Cited

U.S. PATENT DOCUMENTS 5,611,750 A * 3/1997 Kono et al. ................... 477/65
5,620,390 A * 4/1997 Kono et al. ................... 477/65

FOREIGN PATENT DOCUMENTS

| JP | 2000-249219 | 9/2000 |
| JP | 2001-248725 | 9/2001 |

\* cited by examiner

*Primary Examiner*—Dirk Wright
(74) *Attorney, Agent, or Firm*—Oblon, Spivak, McClelland, Maier & Neustadt, P.C.

(57) ABSTRACT

At a first forward speed, the oil passage in a relay valve is switched to control the torque capacity of a lock-up clutch using a linear solenoid valve that controls the engagement pressure of a clutch that is engaged at each of fifth to eighth forward speeds. At each of second to eighth forward speeds, the oil passage in another relay valve is switched to control the torque capacity of the lock-up clutch using a linear solenoid valve that controls the engagement pressure of a brake that is engaged at the first forward speed.

8 Claims, 17 Drawing Sheets

FIG. 2

| | C1 | C2 | C3 | C4 | B1 | B2 | L/U | SL1 | SL2 | SL3 | SL4 | SL5 | SR | SL | SLU |
|---|---|---|---|---|---|---|---|---|---|---|---|---|---|---|---|
| Rev | × | × | × | ○ | × | ○ | × | × | × | × | ○ | × | ○ | × | ○ |
| N | × | × | × | × | × | × | × | ○ | × | × | × | × | ○ | × | × |
| 1st | ○ | × | × | × | × | ○ | ◎ | ○ | ◎ | × | × | × | × | ◎ | ○ |
| 2nd | ○ | × | × | × | ○ | × | ◎ | ○ | × | × | × | ○ | ○ | ◎ | ◎ |
| 3rd | ○ | × | ○ | × | × | × | ◎ | ○ | × | ○ | × | × | ○ | ◎ | ◎ |
| 4th | ○ | × | × | ○ | × | × | ◎ | ○ | × | × | ○ | × | ○ | ◎ | ◎ |
| 5th | ○ | ○ | × | × | × | × | ◎ | ○ | ○ | × | × | × | ○ | ◎ | ◎ |
| 6th | × | ○ | × | ○ | × | × | ◎ | × | ○ | × | ○ | × | ○ | ◎ | ◎ |
| 7th | × | ○ | ○ | × | × | × | ◎ | × | ○ | ○ | × | × | ○ | ◎ | ◎ |
| 8th | × | ○ | × | × | ○ | × | ◎ | × | ○ | × | × | ○ | ○ | ◎ | ◎ |

FIG.6

|  | 1st/Rev | OTHERS |
|---|---|---|
| SL2 | L/U | C2 |
| SLU | B2 | L/U |

HYDRAULIC CONTROL APPARATUS AND HYDRAULIC CONTROL METHOD FOR AUTOMATIC TRANSMISSION

INCORPORATION BY REFERENCE

The disclosure of Japanese Patent Application No. 2005-136639 filed on May 9, 2005 including the specification, drawings and abstract is incorporated herein by reference in its entirety.

BACKGROUND OF THE INVENTION

1. Field of the Invention

The invention relates to a hydraulic control apparatus for an automatic transmission. More particularly, the invention relates to a hydraulic control apparatus and a hydraulic control method that individually control engagement pressures of a plurality of hydraulic engagement devices that are used to achieve a plurality of shift speeds using respective solenoid valves, and control engagement of a lock-up clutch using the solenoid valves.

2. Description of the Related Art

In some automatic transmissions, a plurality of shift speeds at which the speed ratio are different from each other are achieved by selectively engaging a plurality of hydraulic engagement devices. Japanese Patent Application Publication No. JP-A-2000-249219 describes an example of a hydraulic control apparatus that individually controls engagement pressures of a plurality of hydraulic engagement devices using respective solenoid valves in such automatic transmissions. Japanese Patent Application Publication No. JP-A-2001-248725 describes an automatic transmission that includes a hydraulic power transmission device with a lock-up clutch. In the automatic transmission, the engagement pressures of the hydraulic engagement devices and the torque capacity of the lock-up clutch are controlled using one solenoid valve. That is, a control hydraulic pressure output from the solenoid valve is selectively supplied to the engagement devices or the lock-up clutch using a relay valve (switching valve), whereby the engagement pressures of the engagement devices or the torque capacity of the lock-up clutch can be selectively controlled. After the engagement device is completely engaged, supply of the control hydraulic pressure to the engagement device stops, and a line hydraulic pressure is supplied to the engagement device. Therefore, the torque capacity of the lock-up clutch can be controlled using the control hydraulic pressure output from the solenoid valve.

For example, the technology described in Japanese Patent Application Publication No. JP-A-2001-248725 may be applied to the automatic transmission described in Japanese Patent Application Publication No. JP-A-2000-249219. More specifically, in the case where a solenoid valve controls the engagement pressure of the hydraulic engagement device that is engaged at the first forward speed, the solenoid valve may be also used to control the torque capacity of the lock-up clutch. However, when the lock-up clutch is engaged even at the first forward speed, supply of the control hydraulic pressure to the engagement device needs to be stopped, and the line hydraulic pressure needs to be supplied to the engagement device. In this case, when the shift speed is changed from the first forward speed to another forward speed, the engagement device needs to be disengaged by supplying the control hydraulic pressure to the engagement device again, and stopping supply of the line hydraulic pressure to the engagement device. This requires a complex control scheme, and may adversely affect shift response. Actually, the torque capacity of the lock-up clutch cannot be controlled at the first forward speed. In the case where another solenoid valve controls the engagement pressure of the engagement device that is engaged at a forward speed other than the first forward speed and the solenoid valve is used to control the torque capacity of the lock-up clutch, the torque capacity of the lock-up clutch cannot be controlled at the forward speed.

In this specification, the phrase "the hydraulic pressure is supplied" signifies "the hydraulic pressure is applied" or "hydraulic oil that is controlled by the hydraulic pressure is supplied".

SUMMARY OF THE INVENTION

The invention facilitates engagement of a lock-up clutch at predetermined shift speeds without causing excessive delays in shift response, in the case where solenoid valves control the engagement pressures of engagement devices that are engaged to achieve the predetermined shift speeds, and the solenoid valves are also used to control the torque capacity of the lock-up clutch.

A first aspect of the invention relates to a hydraulic control apparatus for an automatic transmission that includes a hydraulic power transmission device with a lock-up clutch. In the automatic transmission, a plurality of hydraulic engagement devices are selectively engaged to achieve any one of a plurality of shift speeds which have different speed ratios. The hydraulic control apparatus includes a first solenoid valve; a second solenoid valve; and at least one oil-passage selection device. The first solenoid valve controls the engagement pressure of a first engagement device that is engaged at a first predetermined shift speed, and that is disengaged at a second predetermined shift speed. The second solenoid valve controls the engagement pressure of a second engagement device that is disengaged at the first predetermined shift speed, and that is engaged at the second predetermined shift speed. The oil-passage selection device selects between a first oil passage used to control the engagement pressure of the first engagement device and a second oil passage used to control the torque capacity of the lock-up clutch, and supplies a first control hydraulic pressure output from the first solenoid valve to the selected oil passage. The oil-passage selection device also selects between a third oil passage used to control the engagement pressure of the second engagement device and the second oil passage, and supplies a second control hydraulic pressure output from the second solenoid valve to the selected oil passage.

A second aspect of the invention relates to a hydraulic control method for an automatic transmission which includes a hydraulic power transmission device with a lock-up clutch. In the automatic transmission, a plurality of hydraulic engagement devices are selectively engaged to achieve any one of a plurality of shift speeds which have different speed ratios. In the method, a first oil passage used to control the engagement pressure of a first engagement device or a second oil passage used to control the torque capacity of a lock-up clutch is selected, and a first control hydraulic pressure output from a first solenoid valve is supplied to the selected oil passage. The first solenoid valve controls the engagement pressure of the first engagement device that is engaged at a first predetermined shift speed, and that is disengaged at a second predetermined shift speed. Also, a third oil passage used to control the engagement pressure of a second engagement device or the second oil passage is selected, and a second control hydraulic pressure output from a second solenoid valve is supplied to the selected oil passage. The second solenoid valve controls the engagement pressure of the second engagement device that is disengaged at the first predetermined shift speed, and that is engaged at the second predetermined shift speed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 illustrates a diagram explaining the operating states of engagement elements and solenoid valves when each shift speed is achieved in the automatic transmission for a vehicle in FIG. 1;

FIG. 6 is a diagram showing the destinations of control pressures output from linear solenoid valves SLU and SL2 of the hydraulic control circuit at each shift speed;

DETAILED DESCRIPTION OF THE EXEMPLE EMBODIMENTS

Figure 1:
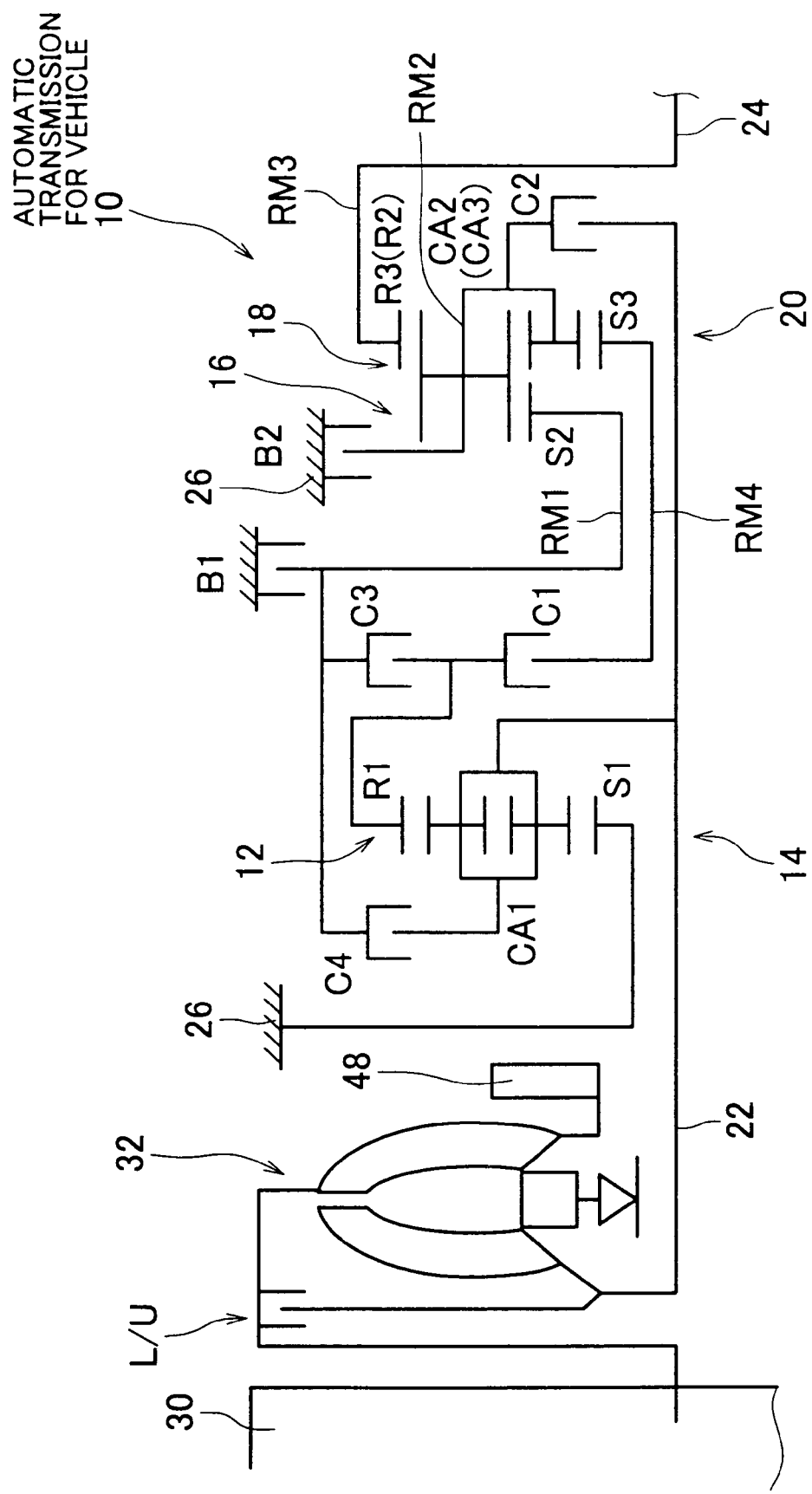
FIG. 1 illustrates a schematic diagram explaining an automatic transmission for a vehicle that includes a hydraulic control apparatus according to an embodiment of the invention.

Hereinafter, an embodiment of the invention will be described in detail with reference to the drawings. FIG. 1 illustrates a schematic diagrams showing an automatic transmission for a vehicle 10. FIG. 2 illustrates an operation diagram explaining the operating states of engagement elements in the automatic transmission 10 at each of a plurality shift speeds. The automatic transmission 10 is appropriately disposed in the longitudinal direction of a front-engine rear-drive vehicle. The automatic transmission 10 includes a first shifting portion 14 and a second shifting portion 20 that are disposed on the same axis. The first shifting portion 14 includes a first planetary gear unit 12 of a double pinion type. The second shifting portion 20 includes a second planetary gear unit 16 of a single pinion type and a third planetary gear unit 18 of a double pinion type. The rotational speed of an input shaft 22 that is input to the automatic transmission 10 is changed, and the changed rotational speed is output to an output shaft 24. The input shaft 22 is employed as an input member. In this embodiment, the input shaft 22 is the turbine shaft of a torque converter 32 that is driven by an engine 30. The output shaft 24 is employed as an output member. The output shaft 24 drives the left and right driving wheels via a propeller shaft and a differential gear device. The torque converter 32 is a hydraulic power transmission device. The torque converter 32 includes a lock-up clutch L/U that directly transmits power to the input shaft 22 from the engine 30 without using fluid. Because the automatic transmission 10 and the torque converter 32 are substantially symmetric with respect to a center line, only the upper half parts of the automatic transmission 10 and the torque converter 32 are shown.

The first planetary gear 12 constituting the first shifting portion 14 includes three rotational elements, that are, a sun gear S1, a carrier CA1, and a ring gear R1. When the sun gear S1 is fixed to a transmission case (hereinafter, referred to simply as "case") 26 such that the sun gear S1 does not rotate, and the carrier CA1 is integrally connected with the input shaft 22 such that the carrier CA1 rotates, the rotational speed of the ring gear R1 is reduced with respect to the rotational speed of the input shaft 22. The ring gear R1 outputs a reduced rotational speed. In the second shifting portion 20, the second planetary gear unit 16 and the third planetary gear unit 18 have some components in common. In particular, the second shifting portion 20 includes four rotational elements RM1 to RM4. More specifically, the sun gear S2 of the second planetary gear unit 16 constitutes the first rotational element RM1. The carrier CA2 of the second planetary gear unit 16 also functions as the carrier CA3 in the third planetary gear unit 18. The carrier CA2 (CA3) constitutes the second rotational element RM2. The ring gear R3 of the third planetary gear unit 18 also functions as the ring gear R2 of the second planetary gear unit 16. The ring gear R3 (R2) constitutes the third rotational element RM3. The sun gear S3 of the third planetary gear unit 18 constitutes the fourth rotational element RM4. The second planetary gear unit 16 and the third planetary gear unit 18 constitute a Ravigneaux type planetary gear train. That is, a single carrier functions as both the carriers CA2 and CA3. A single ring gear functions as both the ring gears R2 and R3. The second planetary gear unit 16 and the third planetary gear unit 18 have pinions in common.

The first rotational element RM1 (sun gear S2) is connected to the case 26 by a first brake B1, which stops the rotation of the first rotational element RM1. The second rotational element RM2 (carriers CA2 and CA3) is connected to the case 26 by a second brake B2, which stops the rotation of the second rotational element RM2. The fourth rotational element RM4 (sun gear S3) is connected to the ring gear R1 of the first planetary gear unit 12 via a first clutch C1. The ring gear R1 outputs a reduced rotational speed. The second rotational element RM2 (carriers CA2 and CA3) is connected to the input shaft 22 via a second clutch C2. The first rotational element RM1 (sun gear S2) is connected to the ring gear R1 via a third clutch C3. The first rotational element RM1 is also connected also to the carrier CA1 of the first planetary gear unit 12, that is, the input shaft 22 via a fourth clutch C4. The third rotational element RM3 (ring gears R2 and R3) is connected to the output shaft 24 to output the rotation.

Figure 3:
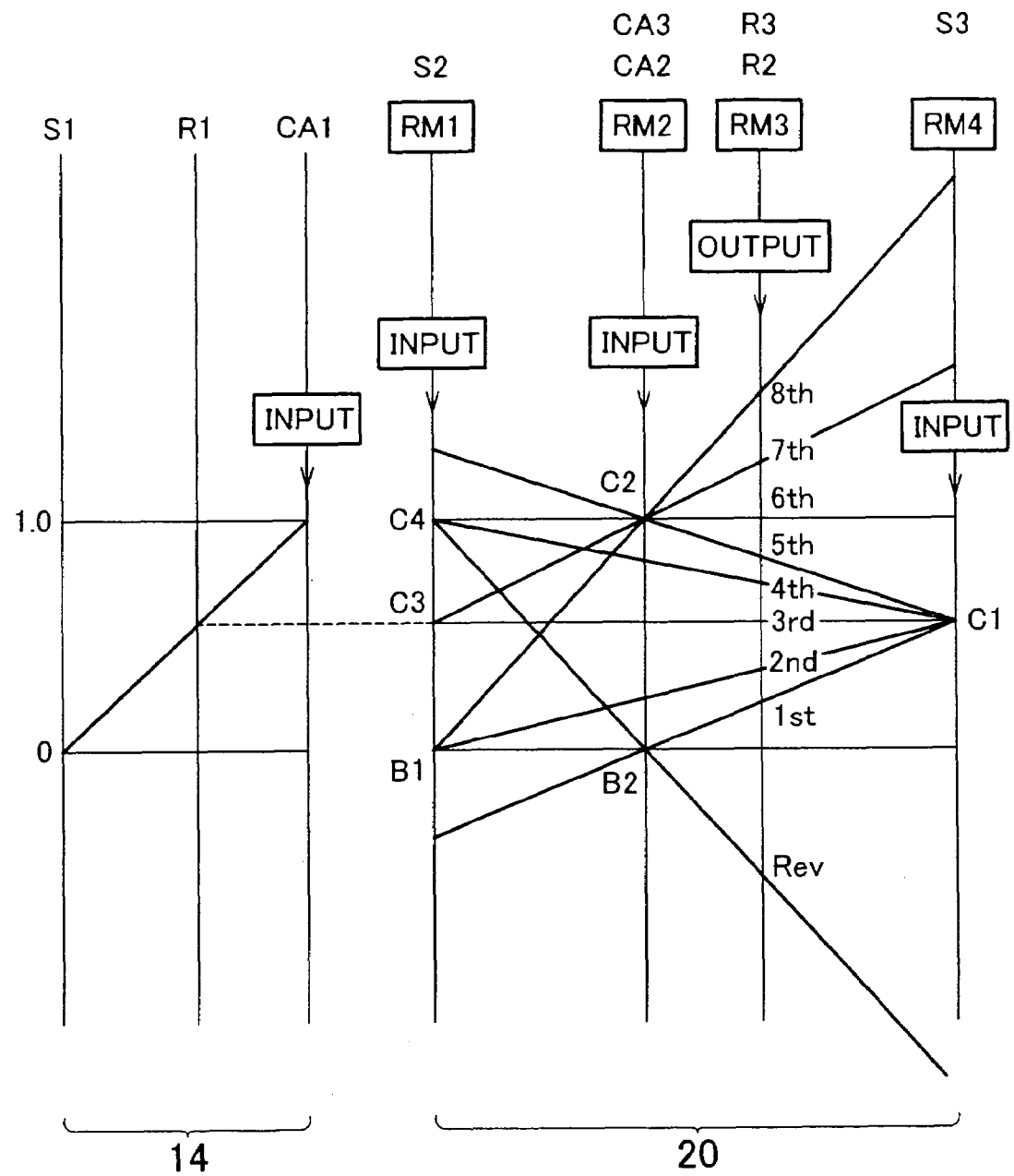
FIG. 3 is a collinear diagram where rotational speeds of rotational elements in the automatic transmission for a vehicle at each shift speed are connected to each other by straight lines.

FIG. 3 illustrates a collinear diagram showing the relation among the rotational speeds of the rotational elements of the first shifting portion 14 and the second shifting portion 20. The lower horizontal axis indicates that the ratio between the rotational speeds of the input shaft 22 and the output shaft 24 is "0". The upper horizontal axis indicates that the ratio is "1.0", that is the rotational speeds of the input shaft 22 and the output shaft 24 are the same. In the first shifting portion 14, the three vertical lines represent, in order from left to right, the sun gear S1, the ring gear R1, and the carrier CA1. The intervals between the vertical lines are set according to a gear ratio (i.e., the number of teeth of the sun gear/the number of teeth of the ring gear) $\rho 1$ of the first planetary gear unit 12. In the second shifting portion 20, the four vertical lines represent, in order from left to right, the first rotational element RM1 (sun gear S2), the second rotational element RM2 (carriers CA2 and CA3), the third rotational element RM3 (ring gears R2 and R3), and the fourth rotational element RM4 (sun gear S3). The intervals between the vertical lines are set according to a gear ratio $\rho 2$ of the second planetary gear unit 16 and a gear ratio $\rho 3$ of the third planetary gear unit 18.

As evident from the aforementioned collinear diagram (FIG. 3), when the first clutch C1 and the second brake B2 are engaged, the fourth rotational element RM4 is rotated integrally with the ring gear R1 at a reduced rotational speed, and the rotation of the second rotational element RM2 is stopped, which causes the third rotational element RM3, connected to the output shaft 24, to rotate at a rotational speed "$1^{st}$". As a result, the first forward speed is achieved. At the first forward speed, the speed ratio (i.e., a rotational speed NIN of the input shaft 22/a rotational speed NOUT of the output shaft 24) is greatest. When the first clutch C1 and the first brake B1 are engaged, the fourth rotational element RM4 is rotated integrally with the ring gear R1 at a reduced rotational speed, and the rotation of the first rotational element RM1 is stopped, which causes the third rotational element RM3 to rotate at a rotational speed "$2^{nd}$". As a result, a second forward speed is achieved. The speed ratio at the second forward speed is smaller than the speed ratio at the first forward speed. When the first clutch C1 and the third clutch C3 are engaged, the second shifting portion 20 is rotated integrally with the ring gear R1 at a reduced rotational speed, which causes the third rotational element RM3 to rotate at a rotational speed "$3^{rd}$", that is, at the rotational speed equal to the rotational speed of the ring gear R1. As a result, a third forward speed is achieved. The speed ratio at the third forward speed is smaller than the speed ratio at the second forward speed. When the first clutch C1 and the fourth clutch C4 are engaged, the fourth rotational element RM4 is rotated integrally with the ring gear R1 at a reduced speed, and the first rotational element RM1 is rotated integrally with the input shaft 22, which causes the third rotational element RM3 to rotate at a rotational speed "$4^{th}$". As a result, a fourth forward speed is achieved. The gear ratio at the fourth forward speed is smaller than the gear ratio at the third forward speed. When the first clutch C1 and the second clutch C2 are engaged, the fourth rotational element RM4 is rotated integrally with the ring gear R1 at a reduced rotational speed, and the second rotational element RM2 is rotated integrally with the input shaft 22, which causes the third rotational element RM3 to rotate at a rotational speed "$5^{th}$". As a result, a fifth forward speed "$5^{th}$" is achieved. The gear ratio at the fifth forward speed is smaller than the gear ratio at the fourth forward speed.

When the second clutch C2 and the fourth clutch C4 are engaged, the second shifting portion 20 is rotated integrally with the input shaft 22, which causes the third rotational element RM3 to rotate at a rotational speed "$6^{th}$", that is, at the rotational speed equal to the rotational speed of the input shaft 22. As a result, a sixth forward speed is achieved. The gear ratio at the sixth forward speed is smaller than the gear ratio at the fifth forward speed. The gear ratio at the sixth forward speed is 1. When the second clutch C2 and the third clutch C3 are engaged, the second rotational element RM2 is rotated integrally with the input shaft 22, and the first rotational element RM1 is rotated integrally with the ring gear R1 at a reduced rotational speed, which causes the third rotational element RM3 to rotate at a reduced rotational speed "$7^{th}$". As a result, a seventh forward speed is achieved. The gear ratio at the seventh forward speed is smaller than the gear ratio at the sixth forward speed. When the second clutch C2 and the first brake B1 are engaged, the second rotational element RM2 is rotated integrally with the input shaft 22, and the rotation of the first rotational element RM1 is stopped, which causes the third rotational element RM3 to rotate at a rotational speed "$8^{th}$". As a result, an eighth forward speed is achieved. The gear ratio at the eighth forward speed is smaller than the gear ratio at the seventh forward speed.

When the second brake B2 and the fourth clutch C4 are engaged, the rotation of the second rotational element RM2 is stopped, and the first rotational element RM1 is rotated integrally with the input shaft 22, which causes the third rotational element RM3 to rotate in the reverse direction at a rotational speed "Rev". As a result, a reverse speed is achieved.

FIG. 2 illustrates the operating states of the clutches C1 to C4, and the brakes B1 to B2 (hereinafter, referred simply as "clutch(es) C" and "brake(s) B", unless a specific clutch or a specific brake needs to be indicated). FIG. 2 also indicates the operating states of solenoid valves SL1 to SL5, SR, and SLU in a hydraulic control circuit 98 shown in FIG. 4. The solenoid valves engage/disengage the clutches C and the brakes B, and controls the engaging force of the clutches C and the brakes B. That is, each of the clutches C and the brakes B is a hydraulic frictional engagement device that is controlled by a hydraulic actuator. For example, each clutch C is a multiple disc clutch, and each brake B is a multiple disc brake. By energizing or de-energizing the linear solenoid valves SL1 to SL5 and SLU, by controlling electric current, by energizing or de-energizing an ON-OFF solenoid valve SR, or by operating a manual valve (not shown) using a shift lever 72, oil passages are mechanically selected. As a result, the appropriate clutch C and the brake B are engaged/disengaged, and the hydraulic pressure is controlled in the process of engaging/disengaging the clutch 3 and the brake B. The ON-OFF solenoid valve SL in FIG. 2 and FIG. 4 engages/disengages the lock-up clutch LIU. In FIG. 2, in the columns for the clutches C1 to C4, the brakes B1 and B2, and the lock-up clutch L/U, cross marks indicate the disengaged state, and circles indicate the engaged state. In the column L/U, double circles indicate that the lock-up clutch L/U is engaged. In the columns SL1 to SLU, circles indicate that the solenoid valve is energized, and cross marks indicate that the solenoid valve is de-energized. Double circles indicate that the solenoid valve is in the energized state when the lock-up clutch L/U is engaged. The ON-OFF solenoid valve SR is a normally-open valve. The solenoid valves SL1 to SL5, SL, and SLU are normally-closed valves.

Figure 7:
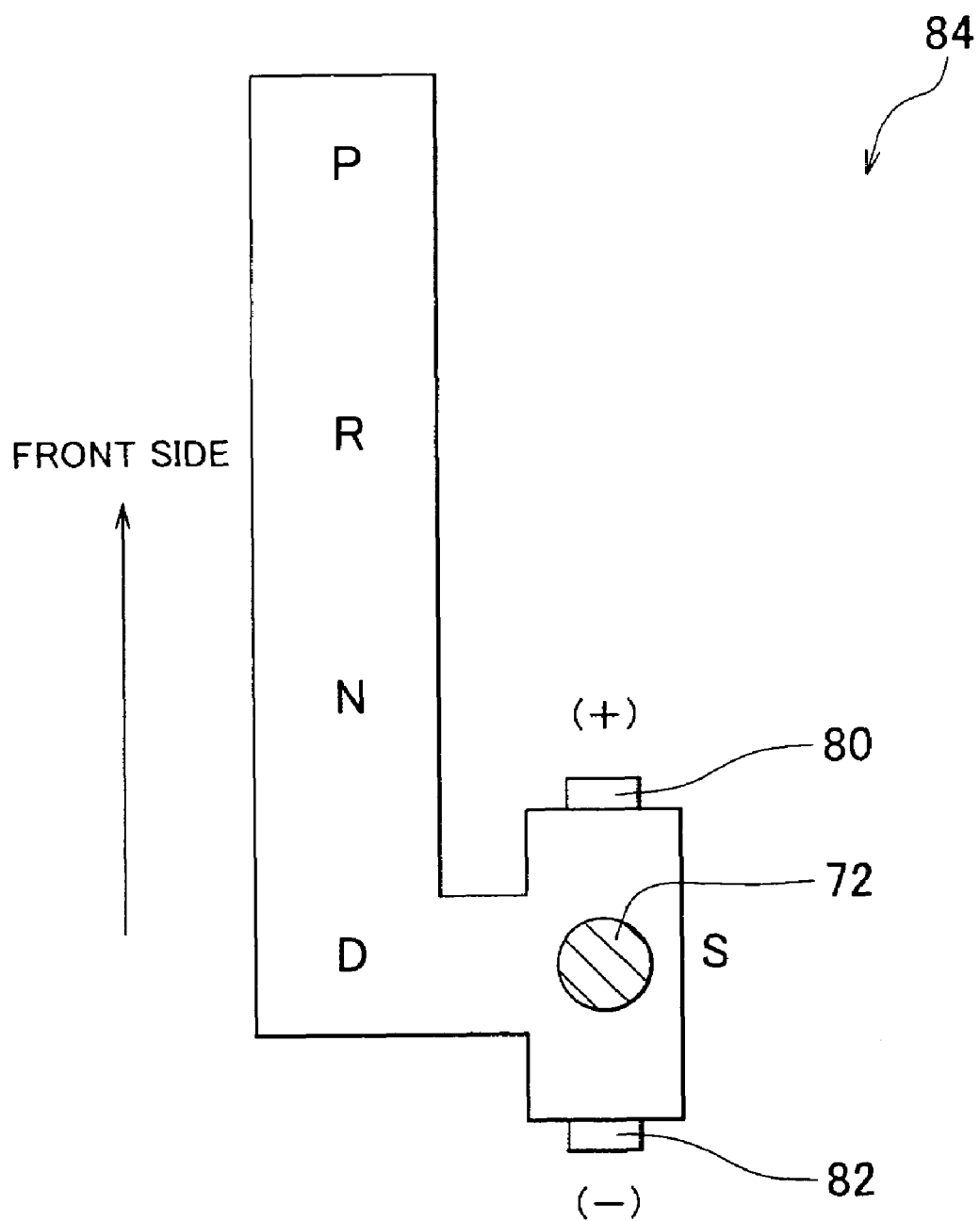
FIG. 7 is a diagram explaining an example of a shift pattern of a shift lever in FIG. 4.

The shift lever 72 is provided in a center console on the side of a driver's seat. For example, the shift lever 72 is moved to one of five positions "P (parking)", "R (reverse)", "N (neutral)", "D (drive)", and "S (sequential)" that are arranged in a shift pattern 84 shown in FIG. 7. When the shift lever 72 is at the position "P", the vehicle is in park. When the shift lever 72 is at the position "R", the vehicle is in reverse. When the shift lever 72 is at the position "N", power transmission is interrupted. When the shift lever 72 is at the position "D", the vehicle runs forward and automatic shifting operation is performed. When the shift lever 72 is at the position "S", the vehicle runs forward and manual shifting operation can be performed. The positions "P", "R", "N" and "D" are arranged in order from the front to the rear in the longitudinal direction of the vehicle. The position "S" is set off to the side of the position "D" toward the driver's seat in the lateral direction of the vehicle. When the shift lever 72 is moved between the positions "P" and "D", a spool valve element or the like of the manual valve is mechanically moved straight, whereby oil passages are selected in the hydraulic control circuit 98. More specifically, when the shift lever 72 is moved to the position "R", the manual valve outputs a line hydraulic pressure PL that is used to allow the vehicle to back up (hereinafter, referred to as "reverse hydraulic pressure") PR, and drains the hydraulic pressure that is used to allow the vehicle to run forward (hereinafter, referred to as "forward hydraulic pressure") PD. When the shift lever 72 is moved to the position "D" (or "S"), the manual valve outputs the line hydraulic pressure PL as the forward hydraulic pressure PD, and drains the reverse hydraulic pressure PR. When the shift lever 72 is moved to the position "P" or "N", the manual valve drains both of the forward hydraulic pressure PD and the reverse hydraulic pressure PR. A regulator valve or the like regulates a hydraulic pressure output from a mechanical oil pump 48 (refer to FIG. 1) according to an engine load and the like, thereby outputting the line hydraulic pressure PL. The oil pump 48 is driven by the engine 30.

Figure 6:
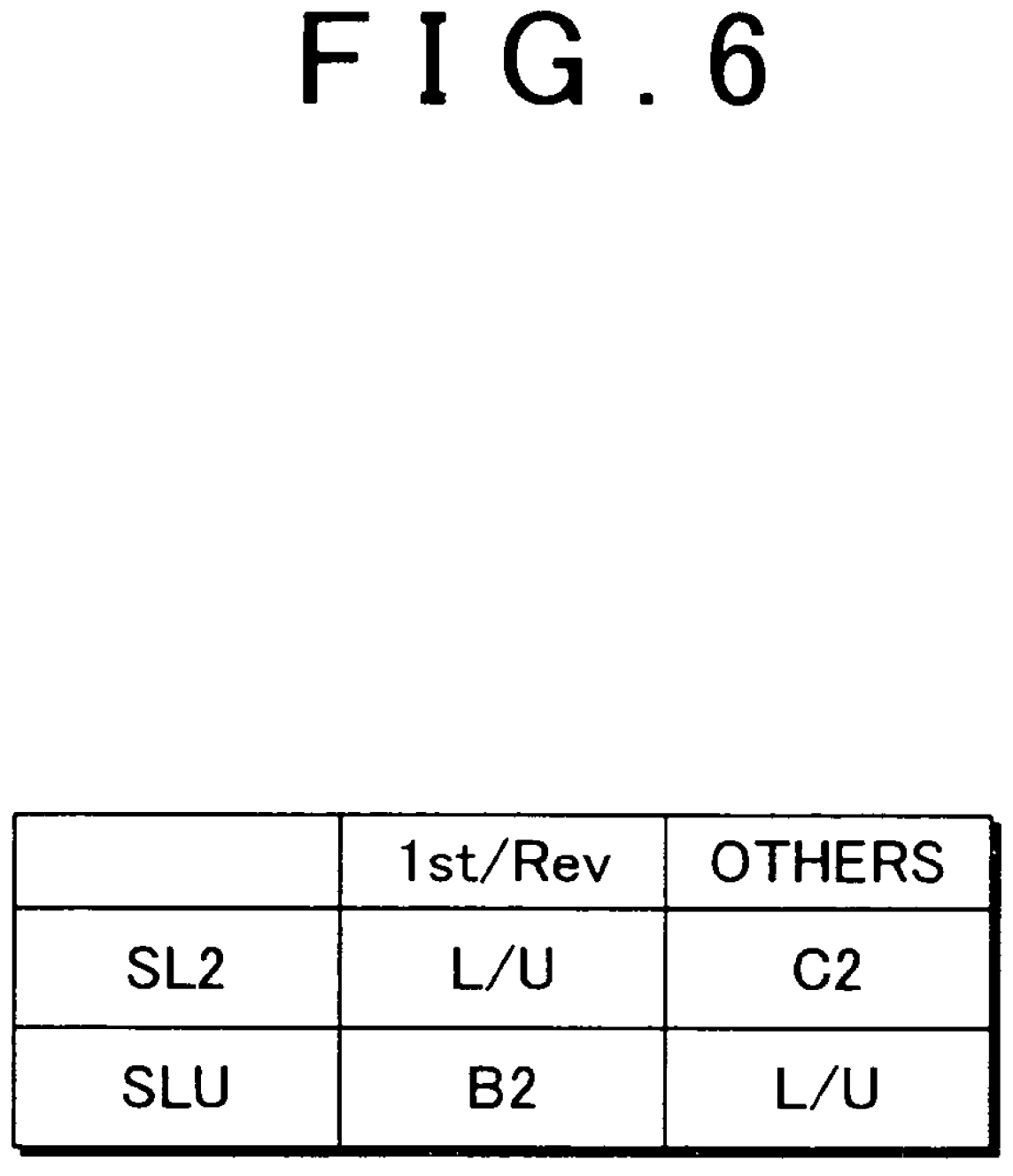

The linear solenoid valves SL1 to SL5 and SLU directly control the engagement pressures of the clutches C1 to C4, and the brakes B1 and B2, respectively. The linear solenoid valves SLU and SL2 are also used to engage the lock up clutch L/U. The linear solenoid valve SLU corresponds to the second brake B2 that is engaged to achieve the first forward speed. The linear solenoid valve SL2 corresponds to the second clutch C2 that is engaged at the fifth forward speed. The linear solenoid valves SLU and SL2 are also used to engage the lock-up clutch L/U. That is, at the first forward speed and the reverse speed, the second clutch C2 does not need to be engaged as shown in FIG. 6. Therefore, when the first forward speed or the reverse speed is achieved, the torque capacity of the lock-up clutch L/U is controlled using the linear solenoid valve SL2 to engage the lock-up clutch L/U as necessary, and the engagement pressure PB2 of the second brake B2 is controlled using the linear solenoid valve SLU to engage the second brake B2. At each of the second to eighth forward speeds, the second brake B2 does not need to be engaged. Therefore, when each of the second to eighth forward speeds is achieved, the torque capacity of the lock-up clutch L/U is controlled using the linear solenoid valve SLU to engage the lock-up clutch L/U as necessary. Also, when each of the fifth to eighth forward speeds is achieved, an engagement pressure PC2 of the second clutch C2 is controlled using the linear solenoid valve SL2 to engage the second clutch C2. In FIG. 2, the lock-up clutch LIU is not engaged at the reverse speed. However, the lock-up clutch L/U may be engaged at the reverse speed by energizing the ON-OFF solenoid valve SL and the linear solenoid valve SL2.

In this embodiment, the first forward speed is employed as the first predetermined shift speed according to the invention, and the fifth forward speed is employed as the second predetermined shift speed according to the invention. The second brake B2 is employed as the first engagement device according to the invention, and the second clutch C2 is employed as the second engagement device according to the invention. The linear solenoid valve SLU is employed as the first solenoid valve according to the invention. The linear solenoid valve SL2 is employed as the second solenoid valve according to the invention.

In this embodiment, when the shift speed is changed from the first forward speed to the second forward speed, the valve that is used to control the lock-up clutch is changed from the linear solenoid valve SL2 to the linear solenoid valve SLU. However, at each of the second to fourth forward speeds, neither the second clutch C2 nor the second brake B2 is engaged, and therefore the linear solenoid valve SLU is not used to engage the second brake B2 and the linear solenoid valve SL2 is not used to engage the second clutch C2. Accordingly, the valve that is used to control the lock-up clutch may be changed from the linear solenoid valve SL2 to the linear solenoid valve SLU also when the shift speed is changed from the second forward speed to the third forward speed, from the third forward speed to the fourth forward speed, or from the fourth forward speed to the fifth forward speed. For example, when the shift speed is changed from the second forward speed to the third forward speed, the valve that is used to control the lock-up clutch can be changed from the linear solenoid valve SL2 to the linear solenoid valve SLU, irrespective of the control to change the shift speed. This is because the linear solenoid valve SLU is not used to engage the second brake B2 and the linear solenoid valve SL2 is not used to engage the second clutch C2 at the second forward speed and the third forward speed, as described above.

Figure 5:
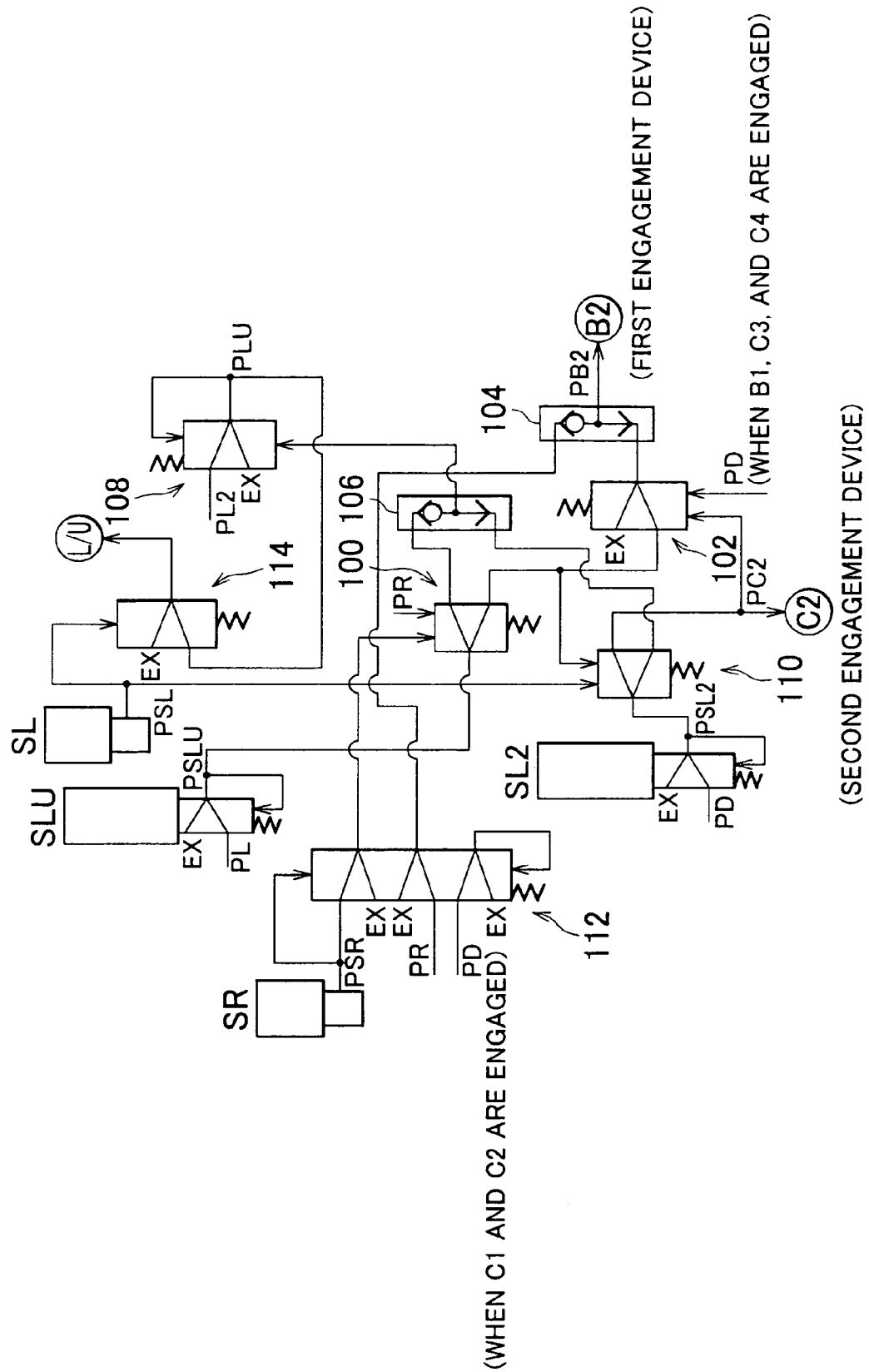
FIG. 5 is a circuit diagram showing the main part of a hydraulic control circuit in FIG. 4.
Figure 10:
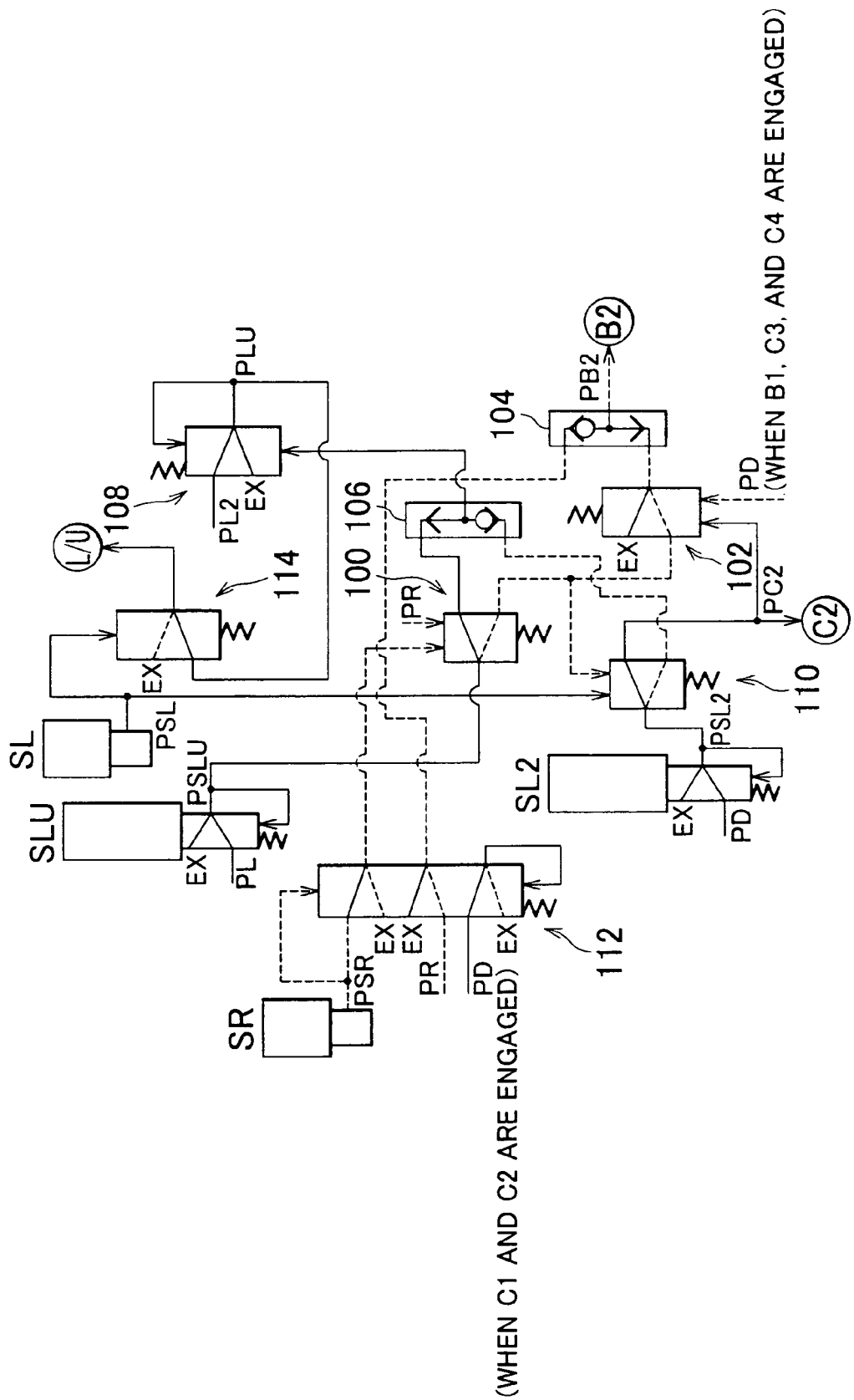
FIG. 10 is a circuit diagram showing presence and absence of a hydraulic pressure in the hydraulic control circuit in FIG. 5 using solid lines and dashed lines in the case where the fifth forward speed is achieved and the lock-up clutch is engaged.
Figure 11:
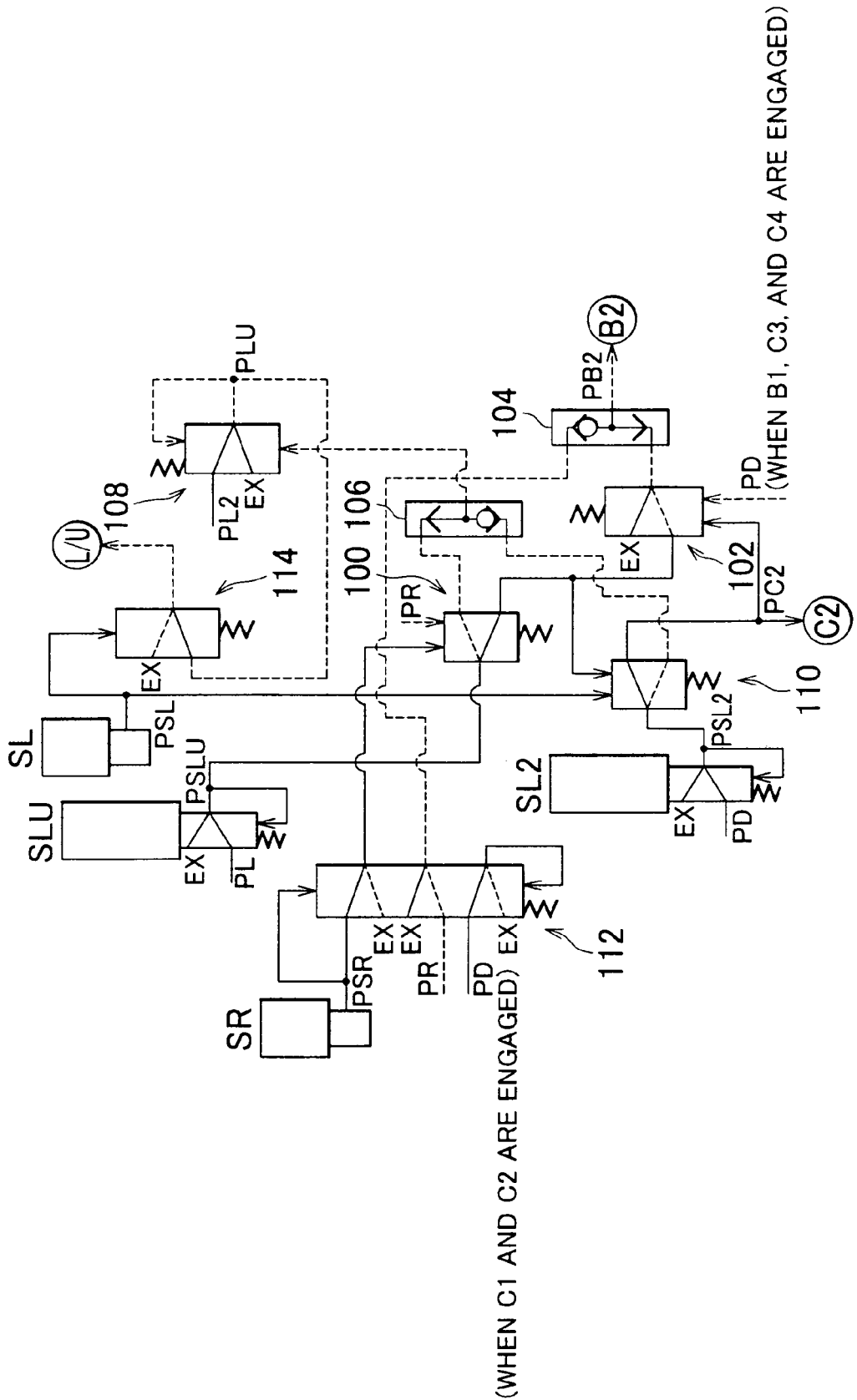
FIG. 11 is a circuit diagram showing presence and absence of the hydraulic pressure in the hydraulic control circuit in FIG. 5 using solid lines and dashed lines in the case where an ON-OFF solenoid valve SR is turned OFF due to failure such as breaking of wire.
Figure 12:
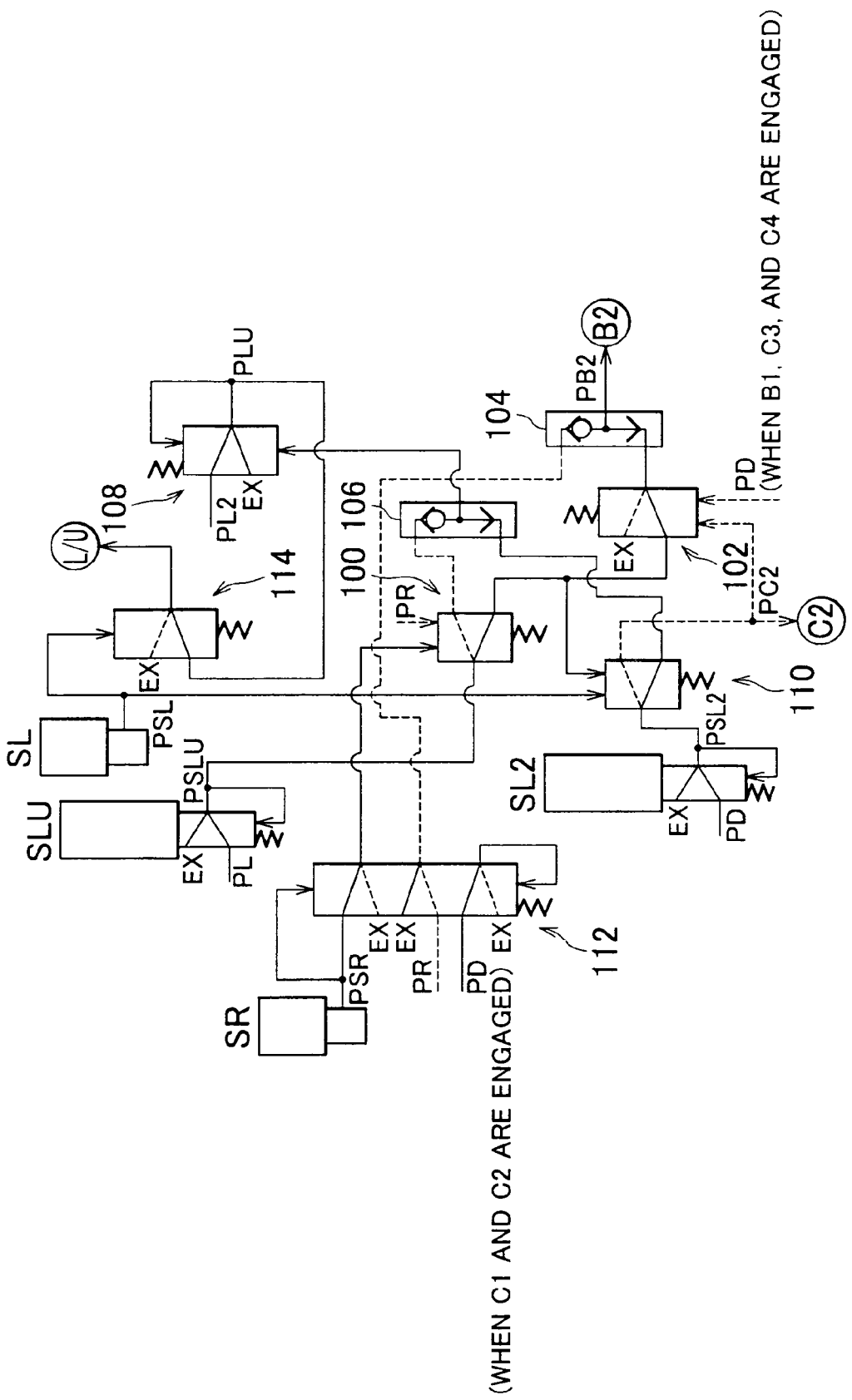
FIG. 12 is a circuit diagram showing presence and absence of the hydraulic pressure in the hydraulic control circuit in FIG. 5 using sold lines and dashed lines in the case where the first forward speed is achieved and the lock-up clutch is engaged.
Figure 13:
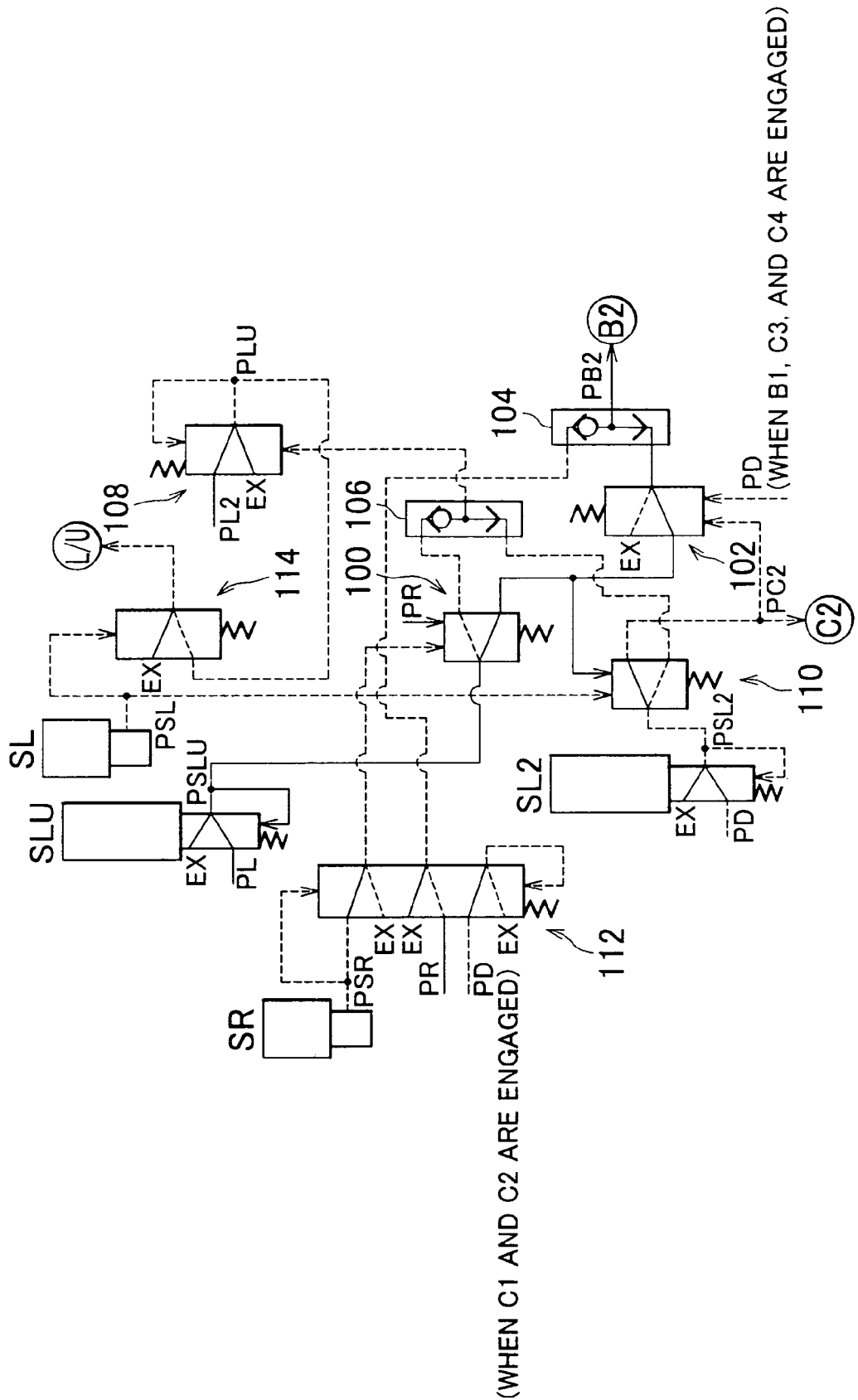
FIG. 13 is a circuit diagram showing presence and absence of the hydraulic pressure in the hydraulic control circuit in FIG. 5 using solid lines and dashed lines in the case where a reverse speed is achieved and the lock up clutch is disengaged.
Figure 14:
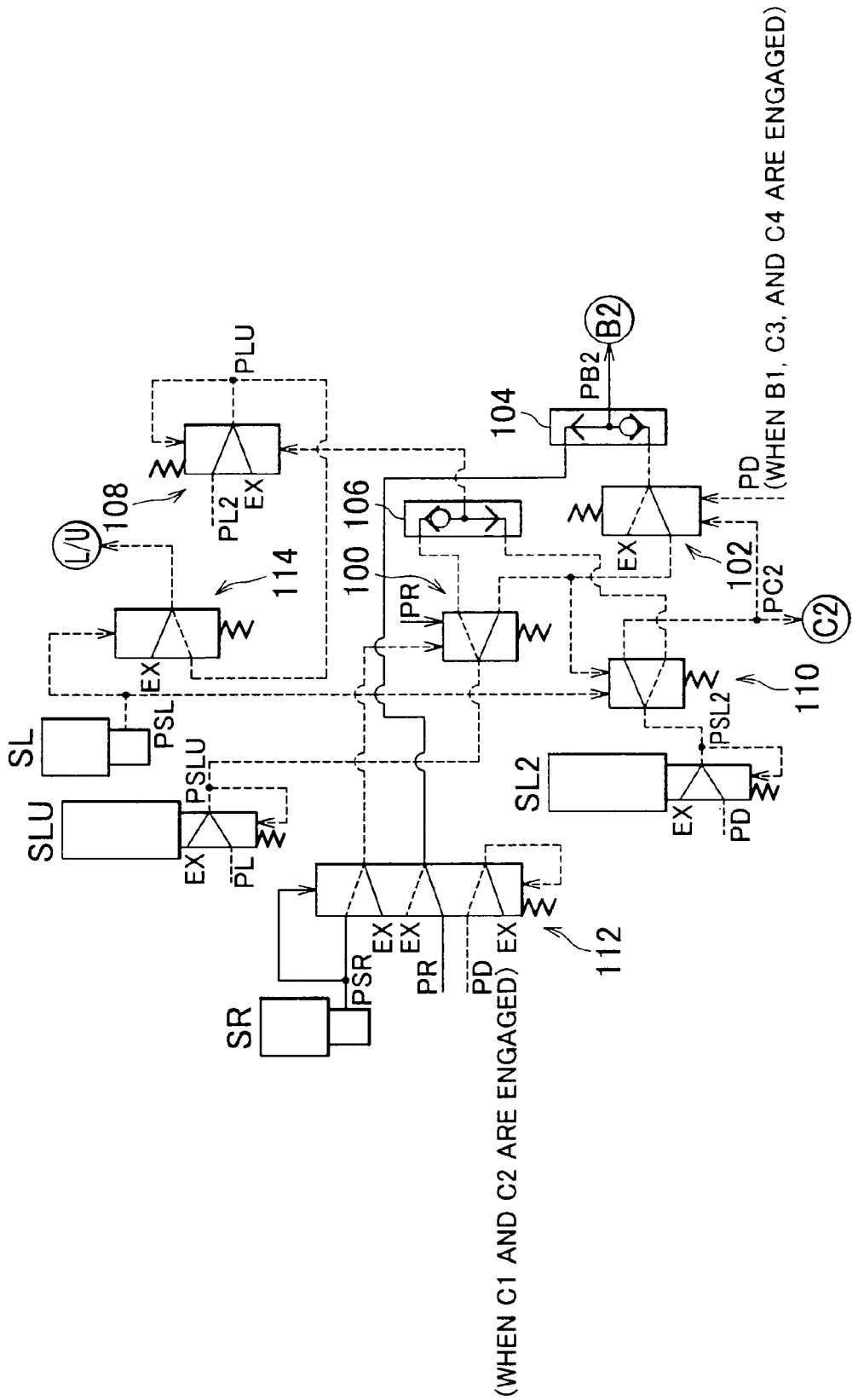
FIG. 14 is a circuit diagram showing presence and absence of the hydraulic pressure in the hydraulic control circuit in FIG. 5 in the case where a power source is turned OFF due to failure such as disconnection of a connector, and a shift lever is moved to a position "R" for reverse running.

FIG. 5 shows the area of the hydraulic control circuit 98, which relates to the engagement control of the second brake B2, the second clutch C2, and the lock-up clutch L/U. The second brake B2 is employed as the first frictional engagement device. The second clutch C2 is employed as the second frictional engagement device. FIG. 10 to FIG. 14 show various operating states of the hydraulic control circuit in FIG. 5. The hydraulic pressure is supplied to the oil passages indicated by solid lines. No hydraulic pressure is supplied to the oil passages indicated by dashed lines. Solid lines in switching valves (relay valves 100, 110, 112, and 114, and a cut-off valve 102) indicate the oil passages through which hydraulic oil flows. Dashed lines in the switching valves indicate the oil passages through which hydraulic oil does not flow. FIG. 10 shows the hydraulic control circuit in the case where the second clutch C2 is engaged at any one of the fifth to eighth forward speeds, and the lock-up clutch L/U is engaged. FIG. 11 shows the hydraulic control circuit in the situations where the ON-OFF solenoid valve is turned OFF due to, for example, failure such as breaking of wire. FIG. 12 shows the hydraulic control circuit in the case where the first forward speed is achieved and the lock-up clutch L/U is engaged. FIG. 13 shows the hydraulic control circuit in the case where the reverse speed is achieved and the lock-up clutch L/U is disengaged. FIG. 14 shows the hydraulic control circuit in the case where a power source is turned OFF, for example, due to failure such as disconnection of a connector and the shift lever 72 is moved to the position "R" to allow the vehicle to back up.

In the hydraulic control circuit, the linear solenoid valves SLU and SL2 regulate the line hydraulic pressure PL and the forward hydraulic pressure PD, respectively, and output a first control hydraulic pressure PSLU and a second control hydraulic pressure PSL2, respectively. An electronic control unit 90 controls the electric current supplied to the linear solenoid valves SLU and SL2 (refer to FIG. 4). Each of the linear solenoid valves SLU and SL2 includes a spool valve element or the like, a feedback oil chamber, a spring, and a solenoid. The feedback oil chamber and the spring are provided on one side of the spool valve element or the like, and the solenoid is provided on the other side of the spool valve element or the like. The control hydraulic pressures PSLU and PSL2 are delivered to the feedback oil chambers of the linear solenoid valves SLU and SL2, respectively. The linear solenoid valves SLU and SL2 regulate the control hydraulic pressures PSLU and PSL2, respectively, by balancing the force of the spring and the electromagnetic force of the solenoid. The first control hydraulic pressure PSLU is supplied to the second brake B2 via the first relay valve 100, a cut-off valve 102, and a first check valve 104. The first control hydraulic pressure PSLU is also supplied to a L/U control valve 108 via the first relay valve 100 and a second check valve 106. The second control hydraulic pressure PSL2 is supplied to the clutch C2 via the second relay valve 110. The second control hydraulic pressure PSL2 is also supplied to the L/U control valve 108 via the second relay valve 110 and the second check valve 106.

The first relay valve 100 selects between an oil passage to the cut-off valve 102 and an oil passage to the second check valve 106, and supplies the first control hydraulic pressure PSLU to the selected oil passage. As shown in FIG. 10, the first relay valve 100 is usually maintained, by the force of the spring, in a state where the first control hydraulic pressure PSLU is output to the second check valve 106 to control the torque capacity of the lock-up clutch L/U. However, when a signal pressure PSR output from the ON-OFF solenoid valve SR is input to the first relay valve 100 via the third relay valve 112 as a signal pressure, or when the reverse hydraulic pressure PR is input to the first relay valve 100 as the signal pressure, the spool valve element or the like is moved against the force of the spring as shown in FIG. 12 and FIG. 13. As a result, the oil passage is changed in the first relay valve 100 so that the first control hydraulic pressure PSLU is output to the cut-off valve 102. The ON-OFF solenoid valve SR is the normally-open valve. When the ON-OFF solenoid valve SR is de-energized, the ON-OFF solenoid valve SR outputs the line hydraulic pressure PL as the signal pressure PSR. As evident from FIG. 2, the ON-OFF solenoid valve SR is de-energized to output the signal pressure PSR at the first forward speed. Then, the signal pressure PSR is input from the third relay valve 112 to the first relay valve 100, whereby the first control hydraulic pressure PSLU is output to the cut-off valve 102. The solenoid valves other than the ON-OFF solenoid valve SR are normally-closed valves, and output the hydraulic pressure when energized.

The cut-off valve 102 prevents the automatic transmission 10 from being locked due to engagement of the second brake B2 at each of the second to eighth forward speeds. As shown in FIG. 12 and FIG. 13, the cut-off valve 102 is usually maintained, by the force of the spring, in a state where the first control hydraulic pressure PSLU is output to the first check valve 104. According to the first control hydraulic pressure PSLU, the second brake B2 is engaged. The engagement pressure PC2 of the second clutch C2 and the forward hydraulic pressure PD are input to the cut-off valve 102 as the signal pressures. The forward hydraulic pressure PD is output when the first brake B1, the third clutch C3, or the fourth clutch C4 is engaged. When at least one of the engagement pressure PC2 and the forward hydraulic pressure PD is input to the cut-off valve 102, the spool valve element or the like of the cut-off valve 102 is moved against the force of the spring as shown in FIG. 11. As a result, the oil passage in the cut-off valve 102 is switched to interrupt supply of the hydraulic pressure from the first relay valve 100 to the first check valve 104. FIG. 11 shows the operating state of the hydraulic pressure circuit in the case where the ON-OFF solenoid valve SR is turned OFF due to failure such as braking of wire at the fifth forward speed, the oil passage in the first relay valve 100 is switched due to the signal pressure PSR output from the ON-OFF solenoid valve SR, and the first control hydraulic pressure PSLU is supplied to the cut-off valve 102. In this case, the cut-off valve 102 prevents the first control hydraulic pressure PSLU from being output to the first check valve 104, thereby preventing the automatic transmission 10 from being locked due to engagement of the second brake B2.

The first control hydraulic pressure PSLU is supplied to the first check valve 104 from the cut-off valve 102. Also, the reverse hydraulic pressure PR is supplied to the first check valve 104 from the third relay valve 112. When the first control hydraulic pressure PSLU or the reverse hydraulic pressure PR is supplied to the first check valve 104, the first check valve 104 supplies the hydraulic pressure to the second brake B2 to engage the second brake B2. At the first forward speed, the oil passage in the first relay valve 100 is usually switched by the signal pressure PSR as shown in FIG. 12. At the reverse speed, the oil passage in the first relay valve 100 is usually switched by the reverse hydraulic pressure PR as shown in FIG. 13. As a result, at the first forward speed and the reverse speed, the first control hydraulic pressure PSLU is supplied to the first check valve 104 from the first relay valve 100 via the cut-off valve 102, the second brake B2 is engaged according to the first control hydraulic pressure PSLU, and the engagement pressure PB2 is controlled.

However, in the case where the power source is turned OFF due to failure such as disconnection of the connector, the linear solenoid valve SLU is de-energized, and supply of the first control hydraulic pressure PSLU is stopped as shown in FIG. 14. As a result, the first control hydraulic pressure PSLU cannot be used to engage the second brake B2. In this case, the ON-OFF solenoid valve SR supplies the signal pressure PSR to the third relay valve 112. When the shift lever 72 is moved to the position "R" in this case, the reverse hydraulic pressure PR is output and the forward hydraulic pressure PD is drained. Therefore, the spool valve element or the like of the third relay valve 112 is moved against the force of the spring due to the signal pressure PSR, and the oil passage in the third relay valve 112 is switched so that the reverse hydraulic pressure PR is output to the first check valve 104. Accordingly, when the shift lever 72 is moved to the position "R" in the case where the power source is turned off due to failure such as disconnection of wire, the reverse hydraulic pressure PR is supplied to the second brake B2 from the third relay valve 112 via the first check valve 104. This engages the second brake B2. By supplying the reverse hydraulic pressure PR to the fourth clutch C4 via the check valve and the like in the same manner, the reverse speed can be achieved, and the vehicle can back up.

As shown in FIG. 10 to FIG. 13, the third relay valve 112 is usually maintained, by the force of the spring, in a state where supply of the reverse hydraulic pressure PR is stopped. When the forward hydraulic pressure PD is supplied so that the vehicle runs forward, the forward hydraulic pressure PD is applied in the same direction as the direction where the force of the spring is applied. Therefore, even if the signal pressure PSR is applied in the opposite direction as the signal pressure, the spool valve element or the like is not moved. As a result, the signal pressure PSR is output to the first relay valve 100 as shown in FIG. 11 and FIG. 12.

The second relay valve 110 selects between an oil passage to the second clutch C2 and an oil passage to the second check valve 106, and supplies the second control hydraulic pressure PSL2 to the selected oil passage. As shown in FIG. 10, the second relay valve 110 is usually maintained, by the force of the spring, in a state where the second control hydraulic pressure PSL2 is output to the second clutch C2. However, when the signal pressure PSL output from the ON-OFF solenoid valve SL and the first control hydraulic pressure PSLU are both input to the second relay valve 110 as shown in FIG. 12, the spool valve element or the like of the second relay valve 110 is moved against the force of the spring. As a result, the oil passage in the second relay valve 110 is switched so that the second control hydraulic pressure PSL2 is output to the second check valve 106. The ON-OFF solenoid valve SL is the normally-closed valve. As evident from FIG. 2, when the lock-up clutch L/U is engaged, the ON-OFF solenoid valve SL is energized to output the line hydraulic pressure PL as the signal pressure PSL. However, the oil passage in the second relay valve 110 is not switched only by inputting the signal pressure PSL to the second relay valve 110. When the first control hydraulic pressure PSLU reaches a predetermined pressure, for example, a pressure that can engage the second brake B2 substantially completely, the oil passage in the second relay valve 110 is switched against the force of the spring. Accordingly, even if the second brake B2 starts to be engaged based on the first control hydraulic pressure PSLU, the second clutch C2 can be maintained in the engaged state based on the second control hydraulic pressure PSL2 until the engagement pressure PB2 reaches the predetermined pressure. The oil passage in the second relay valve 110 in this embodiment is switched when the signal pressure PSL is input to the second relay valve 110 and the first control hydraulic pressure PSLU reaches the predetermined pressure. However, the force of the spring and the like may be set such that the oil passage in the second relay valve 110 is switched only by the first control hydraulic pressure PSLU without inputting the signal pressure PSL to the second relay valve 110.

The first control hydraulic pressure PSLU is supplied to the second check valve 106 from the first relay valve 100. Also, the second control hydraulic pressure PSL2 is supplied to the second check valve 106 from the second relay valve 110. As shown in FIG. 10 and FIG. 12, the second check valve 106 selectively supplies the first control hydraulic pressure PSLU or the second control hydraulic pressure PSL2 to the L/U control valve 108. The L/U control valve 108 regulates a secondary hydraulic pressure PL2 using the control hydraulic pressures PSLU or PSL2 as the signal pressure, thereby outputting a lock-up hydraulic pressure PLU to the L/U relay valve 114. The L/U relay valve 114 is opened and closed by the signal pressure PSL output from the ON-OFF solenoid valve SL, which serves as the signal pressure. When the signal pressure PSL is supplied to the L/U relay valve 114, the L/U relay valve 114 supplies the lock-up hydraulic pressure PLU to the lock-up clutch L/U such that the lock-up clutch L/U is engaged at the torque capacity corresponding to the lock-up hydraulic pressure PLU. A secondary regulator valve regulates the line hydraulic pressure PL, thereby outputting the secondary hydraulic pressure PL2. The secondary hydraulic pressure PL2 changes according to the torque of the engine 30 as well as the line hydraulic pressure PL.

Hereinafter, the operating states of the hydraulic control circuit shown in FIG. 10 to FIG. 14 will be described. FIG. 10 shows the operating state of the hydraulic control circuit in the case where any one of the fifth to eighth forward speeds is achieved. In this case, the second relay valve 110 is maintained in a state where the second control hydraulic pressure PSL2 output from the linear solenoid valve SL2 is supplied to the second clutch C2. The first relay valve 100 is maintained in a state where the first control hydraulic pressure PSLU output from the linear solenoid valve SLU is supplied to the L/U control valve 108. In FIG. 10, the second clutch C2 is engaged by outputting the second control hydraulic pressure PSL2 to the second clutch C2. In this case, when the first clutch C1 (not shown) is engaged by regulating the hydraulic pressure supplied to the first clutch C1 using the linear solenoid valve SL1, the fifth forward speed is achieved. In FIG. 10, the first control hydraulic pressure PSLU is also output so that the lock-up clutch is engaged at the torque capacity corresponding to the first control hydraulic pressure PSLU.

FIG. 11 shows the operating state of the hydraulic control circuit in the case where any one of the second to eighth forward speeds is achieved. In FIG. 11, the lock-up clutch L/U is engaged based on the first control hydraulic pressure PSLU. In this situation, the ON-OFF solenoid valve SR is turned off due to failure such as breaking of wire, and the signal pressure PSR is supplied to the first relay valve 100 via the third relay valve 112. As a result, the oil passage in the first relay valve 100 is switched against the force of the spring, whereby the first control hydraulic pressure PSLU is supplied to the cut-off valve 102. At each of the second to eighth forward speeds, the cut-off valve 102 interrupts supply of the hydraulic pressure when the engagement pressure PC2 or the forward hydraulic pressure PD is supplied to the cut-off valve 102. This prevents the second brake B2 from being engaged by the first control hydraulic pressure PSLU, thereby preventing the automatic transmission from being locked due to engagement of the second brake B2.

FIG. 12 shows the operating state of the hydraulic control circuit in the case where the first forward speed is achieved, and the lock-up clutch LIU is engaged. In this case, the ON-OFF solenoid valve SR is de-energized, and the signal pressure PSR is output, whereby the oil passage in the first relay valve 100 is switched against the force of the spring. The first control hydraulic pressure PSLU output from the linear solenoid valve SLU is supplied to the second brake B2 via the first relay valve 100, the cut-off valve 102, and the first check valve 104. As a result, the second brake B2 is engaged at the engagement pressure PB2 corresponding to the first control hydraulic pressure PSLU. Also, the first clutch C1 (not shown) is engaged by regulating the hydraulic pressure supplied to the first clutch C1 using the linear solenoid valve SL1. As a result, the first forward speed is achieved. The signal pressure PSL output from the ON-OFF solenoid valve SL and the first control hydraulic pressure PSLU are both input to the second relay valve 110 as the signal pressures, whereby the oil passage in the second relay valve 110 is switched against the force of the spring. The second control hydraulic pressure PSL2 output from the linear solenoid valve SL2 is supplied to the L/U control valve 108 via the second relay valve 110 and the second check valve 106. As a result, the lock-up clutch L/U is engaged at the torque capacity corresponding to the second control hydraulic pressure PSL2.

FIG. 13 shows the operating state of the hydraulic control circuit in the case where the reverse speed is achieved. In this case, the oil passage in the first relay valve 100 is switched against the force of the spring by the reverse hydraulic pressure PR output from the manual valve, whereby the first control hydraulic pressure PSLU output from the linear solenoid valve SLU is supplied to the second brake B2 via the first relay valve 100, the cut-off valve 102, and the first check valve 104. Accordingly, the second brake B2 is engaged by the engagement pressure PB2 corresponding to the first control hydraulic pressure PSLU. Also, the fourth clutch C4 (not shown) is engaged by regulating the hydraulic pressure supplied to the fourth clutch C4 using the linear solenoid valve SL4. As a result, the reverse speed is achieved.

FIG. 14 shows the operating state of the hydraulic control circuit in the case where the power source is turned OFF due to failure such as disconnection of the connector. In this case, the linear solenoid valve SLU is de-energized, and supply of the first control hydraulic pressure PSLU is interrupted. However, the signal pressure PSR is output from the ON-OFF solenoid valve SR. Therefore, when the shift lever 72 is moved to the position "R", and the reverse hydraulic pressure PR is supplied and the forward hydraulic pressure PD is drained, the oil passage in the third relay valve 112 is switched against the force of the spring by the signal pressure PSR. Accordingly, the reverse hydraulic pressure PR is supplied to the second brake B2 via the first check valve 104, which engages the second brake B2. Similarly, the fourth clutch C4 is also engaged by the reverse hydraulic pressure PR. As a result, the reverse speed is achieved, and the vehicle can back up to a refuge area even if the power source is turned OFF due to failure.

Figure 4:
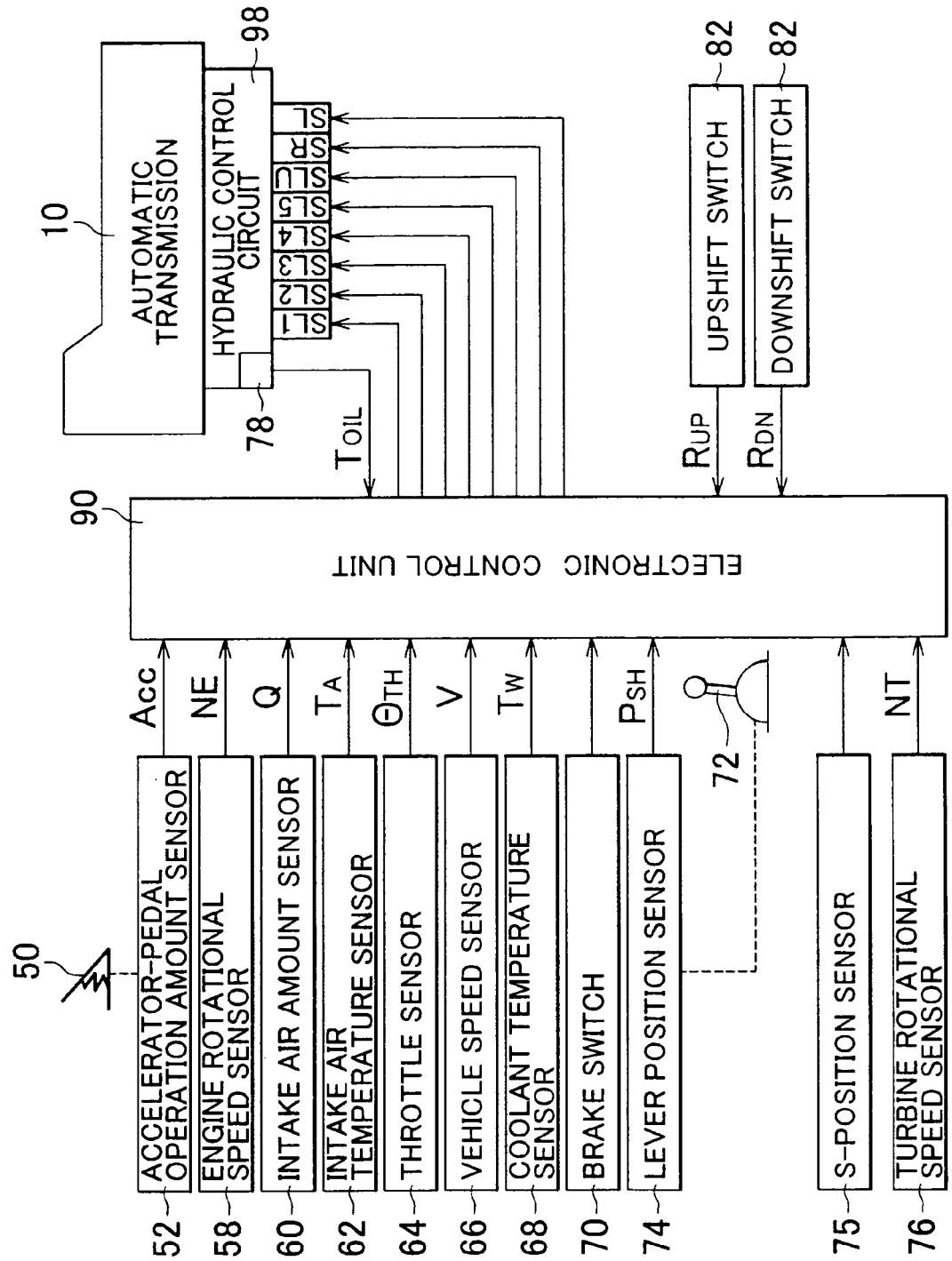
FIG. 4 is a block diagram explaining the main part of a control system of the automatic transmission for a vehicle in FIG. 1.

FIG. 4 is a block diagram explaining the control system provided in the vehicle to control the automatic transmission 10 in FIG. 1 and the like. An accelerator-pedal operation amount sensor 52 detects an operation amount Acc of an accelerator pedal 50, and a signal indicating the accelerator-pedal operation amount Acc is supplied to the electronic control unit 90. The depression of the accelerator pedal 50 varies in accordance with the amount of output required by the driver. The accelerator pedal 50 is employed as an accelerator-pedal operating member. The accelerator-pedal operation amount Acc is employed as the required amount of output. Also, the control system includes an engine rotational speed sensor 58, an intake air amount sensor 60, an intake air temperature sensor 62, a throttle sensor 64 with an idle switch, a vehicle speed sensor 66, a coolant temperature sensor 68, a brake switch 70, a lever position sensor 74, an S-position sensor 75, a turbine rotational speed sensor 76, an AT oil temperature sensor 78, an upshift switch 80, a downshift switch 82, and the like. The engine rotational speed sensor 58 detects a rotational speed NE of the engine 30. The intake air amount sensor 60 detects an intake air amount Q of the engine 30. The intake air temperature sensor 62 detects a temperature TA of intake air. The throttle sensor 64 with the idle switch detects the fully-closed state of an electronic throttle valve of the engine 30 (i.e., the idling state of the engine 30), or an opening amount θTH of the electronic throttle valve. The vehicle speed sensor 66 detects a vehicle speed V (corresponding to a rotational speed NOUT of the output shaft 24). The coolant temperature sensor 68 detects a coolant temperature TW of the engine 30. The brake switch 70 detects whether a foot brake, which is a main brake, has been operated. The lever position sensor 74 detects an operation position PSH at which the shift lever 72 is placed. The S-position sensor 75 detects that the shift lever 72 has been moved to position "S". The turbine rotational speed sensor 76 detects a turbine rotational speed NT (i.e., a rotational speed NIN of the input shaft 22). The AT oil temperature sensor 78 detects an AT oil temperature TOIL that is the temperature of hydraulic oil in the hydraulic control circuit 98. The electronic control unit 90 receives signals indicating the engine rotational speed NE, the intake air amount Q, the intake air temperature TA, the opening amount θTH of the throttle valve, the vehicle speed V, the engine coolant temperature TW, the operation position PSH of the shift lever 72, the turbine rotational speed NT, the AT oil temperature TOIL, an upshift command RUP (described later), a downshift command RDN (described later), and the like, from the aforementioned sensors and switch. Also, the electronic control unit 90 receives a signal indicating whether the brake has been operated, and a signal indicating whether the shift lever 72 has been moved to the position "S".

The electronic control unit 90 is composed of a microcomputer that includes a CPU, RAM, ROM, and an input/output interface. The CPU executes signal processing according to programs that are stored in advance in ROM using a temporary storage function of the RAM, thereby controlling the output of the engine 30, shifting operation of the automatic transmission 10, engagement of the lock-up clutch U, and the like. The electronic control unit 90 may include a portion that controls the engine 30 and a portion that controls the shifting operation of the automatic transmission 10.

Figure 8:
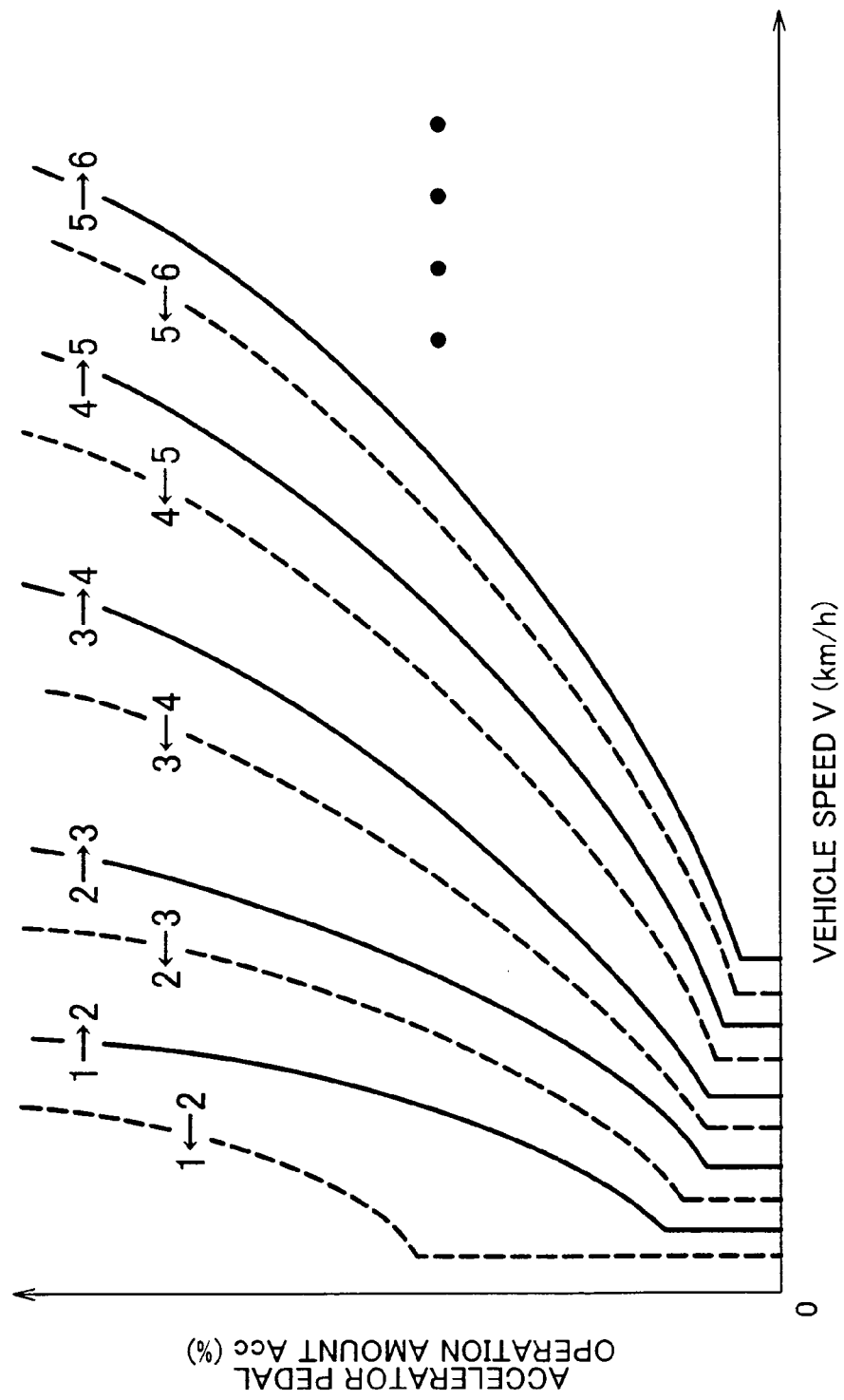
FIG. 8 is a diagram explaining an example of a shift map that is used to automatically change the shift speed of the automatic transmission for a vehicle in FIG. 1 according to the driving state of a vehicle.

The electronic control unit 90 controls the shifting operation of the automatic transmission 10 based on the operation position PSH of the shift lever 72, which is detected by the lever position sensor 74, and the information as to whether the shift lever 72 has been moved to the position "S", which is obtained by the S-position sensor 75. For example, when the shift lever 72 is moved to the position "D", the electronic control unit 90 selects a full-range automatic shifting mode where any one of the first to eighth forward speeds can be automatically selected. That is, the electronic control unit 90 controls the linear solenoid valves SL1 to SL5, and SLU, and the ON-OFF solenoid valve SR to change the operating states of all the clutches C and all the brakes B as shown in FIG. 2, thereby achieving any one of the first to eighth forward speeds. Hereinafter, this control may be referred to as "shifting control". This shifting control is executed according to a shift condition such as a shift map that is stored in advance. FIG. 8 shows an example of the shift map where the vehicle speed V and the accelerator-pedal operation amount Acc as parameters. As the vehicle speed V decreases, or as the accelerator-pedal operation amount Acc increases, the forward speed decreases, that is, the speed ratio increases.

Figure 9:
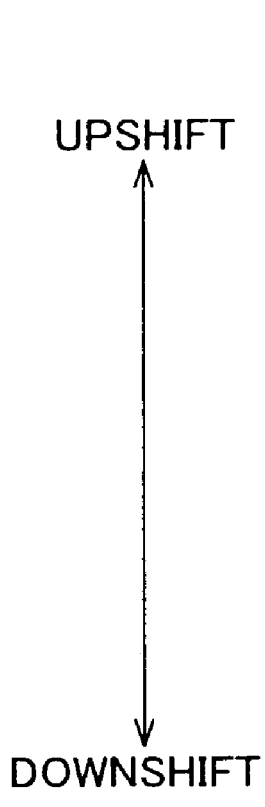
FIG. 9 is a diagram explaining shift ranges that can be selected by operating the shift lever in FIG. 7.

When the shift lever 72 is moved to the position "S" and the S-position sensor 75 outputs an S-position signal, the electronic control unit 90 electrically selects a sequential mode where any one shift range can be selected among a plurality of predetermined shift ranges. Each shift range includes at least one of the first to eighth forward speeds that can be selected at the position "D". In the position "S", an upshift position "+" and a downshift position "−" are provided in the longitudinal direction of the vehicle. The upshift switch 80 detects whether the shift lever 72 has been moved to the upshift position "+". The downshift switch 82 detects whether the shift lever 72 has been moved to the downshift position "−". According to the upshift command RUP or the downshift command RDN, any one of eight shift ranges "D", "7", "6", "5", "4", "3", "2", and "L" shown in FIG. 9 may be electrically selected. The highest speed, that is, the smallest speed ratio in each shift range is different. In each shift range, the shifting operation is automatically controlled, for example, according to the shift map shown in FIG. 8. For example, when the shift lever 72 is moved to the downshift position "−" repeatedly at a downward slope or the like, the shift range is sequentially changed from the range "4" to the range "3", from the range "3" to the range "2", and from the range "2" to the range "L". Accordingly, the shift speed is sequentially changed from the fourth forward speed to the third forward speed, from the third forward speed to the second forward speed, and from the second forward speed to the first forward speed. As a result, the engine braking force is increased in a stepwise manner.

The shift lever 72 is automatically returns from the upshift position "+" or the downshift position "−" to the position "S" by force-applying means such as a spring. Each of the upshift switch 80 and the downshift switch 82 is automatically turned OFF by force-applying means such as a spring. The shift range is changed based on the number of times that the shift lever 72 is moved to the upshift position "+" or the downshift position "−", or the time period during which the shift lever 72 is maintained at the upshift position "+" or the downshift position "−".

The electronic control unit 90 controls engagement of the lock-up clutch L/U while controlling the shifting operation of the automatic transmission 10. At each of the first to eighth forward speeds, the oil passage in the L/U relay valve 114 is switched by energizing the ON-OFF solenoid valve SL. As a result, the torque capacity of the lock-up clutch L/U can be controlled using the lock-up hydraulic pressure PLU. At the first forward speed, the lock-up hydraulic pressure PLU is controlled according to the second control hydraulic pressure PSL2 regulated by the linear solenoid valve SL2. The torque capacity of the lock-up clutch L/U is controlled according to the lock-up hydraulic pressure PLU. At each of the second to eighth forward speeds, the lock-up hydraulic pressure PLU is controlled according to the first control hydraulic pressure PSLU regulated by the linear solenoid valve SLU. The torque capacity of the lock-up clutch L/U is controlled according to the lock-up hydraulic pressure PLU.

In this embodiment, at the first forward speed, the torque capacity of the lock-up clutch L/U is controlled using the linear solenoid valve SL2. The linear solenoid valve SL2 controls the engagement pressure PC2 of the second clutch C2 that is not engaged at the first forward speed, and is engaged at each of the fifth to eighth forward speeds. At each of the second to eighth forward speed, the torque capacity of the lock-up clutch L/U is controlled using the linear solenoid valve SLU. The linear solenoid valve SLU controls the engagement pressure PB2 of the second brake B2 that is not engaged at each of the second to eighth forward speeds, and is engaged at the first forward speed. Therefore, the torque capacity of the lock-up clutch L/U can be appropriately controlled without adversely affecting the shift response, at all the forward speeds including the first forward speed and the fifth to eighth forward speeds at which the shifting control is performed using the linear solenoid valves SL2 and SLU. This improves fuel efficiency. Also, a solenoid valve dedicated for controlling the torque capacity of the lock-up clutch L/U does not need to be provided. Therefore, the hydraulic control apparatus can be configured easily at low cost.

At the first forward speed and the fifth forward speed, one of the second clutch C2 and the second brake B2 is engaged and the other is disengaged by the linear solenoid valve SL2 and SLU. Except when the shift speed is changed directly from the first forward speed to the fifth forward speed or from the fifth forward speed to the first forward speed, clutch-to-clutch operation can be performed as in the conventional case. Therefore, quick shift response can be provided, and the shifting operation can be appropriately controlled without causing shift shock due to a change in torque.

When the shift speed is changed directly from the first forward speed to the fifth forward speed or from the fifth forward speed to the first forward speed, one of the linear solenoid valves SL2 and SLU, which has controlled the shifting operation of the automatic transmission 10, controls the torque capacity of the lock-up clutch L/U. The other of the linear solenoid valves SL2 and SLU, which has controlled the torque capacity of the lock-up clutch L/U, controls the shifting operation of the automatic transmission 10. In this embodiment, when the second brake B2 is engaged at the first forward speed, the second relay valve 110 is maintained in a state where the second control hydraulic pressure PSL2 is supplied to the second clutch C2 until the first control hydraulic pressure PSLU corresponding to the engagement pressure PB2 of the second brake B2 reaches the predetermined pressure. Therefore, when the vehicle decelerates or accelerates suddenly, or when the shift speed is manually downshifted from the fifth forward speed to the first forward speed, the second clutch C2 can be maintained in the engaged stated until the engagement pressure PB2 of the second brake B2 reaches the predetermined pressure. Accordingly, the shifting operation can be performed while preventing shift shock due to a change in torque. When the shift speed is upshifted from the first forward speed to the fifth forward speed, each of the second brake B2 and the second clutch C2 can be maintained in a predetermined engagement state in the same manner as that described above. Therefore, by maintaining both of the second brake B2 and the second clutch C2 in the engaged state for a certain period of time, the shifting operation can be performed while suppressing shift shock.

Figure 15:
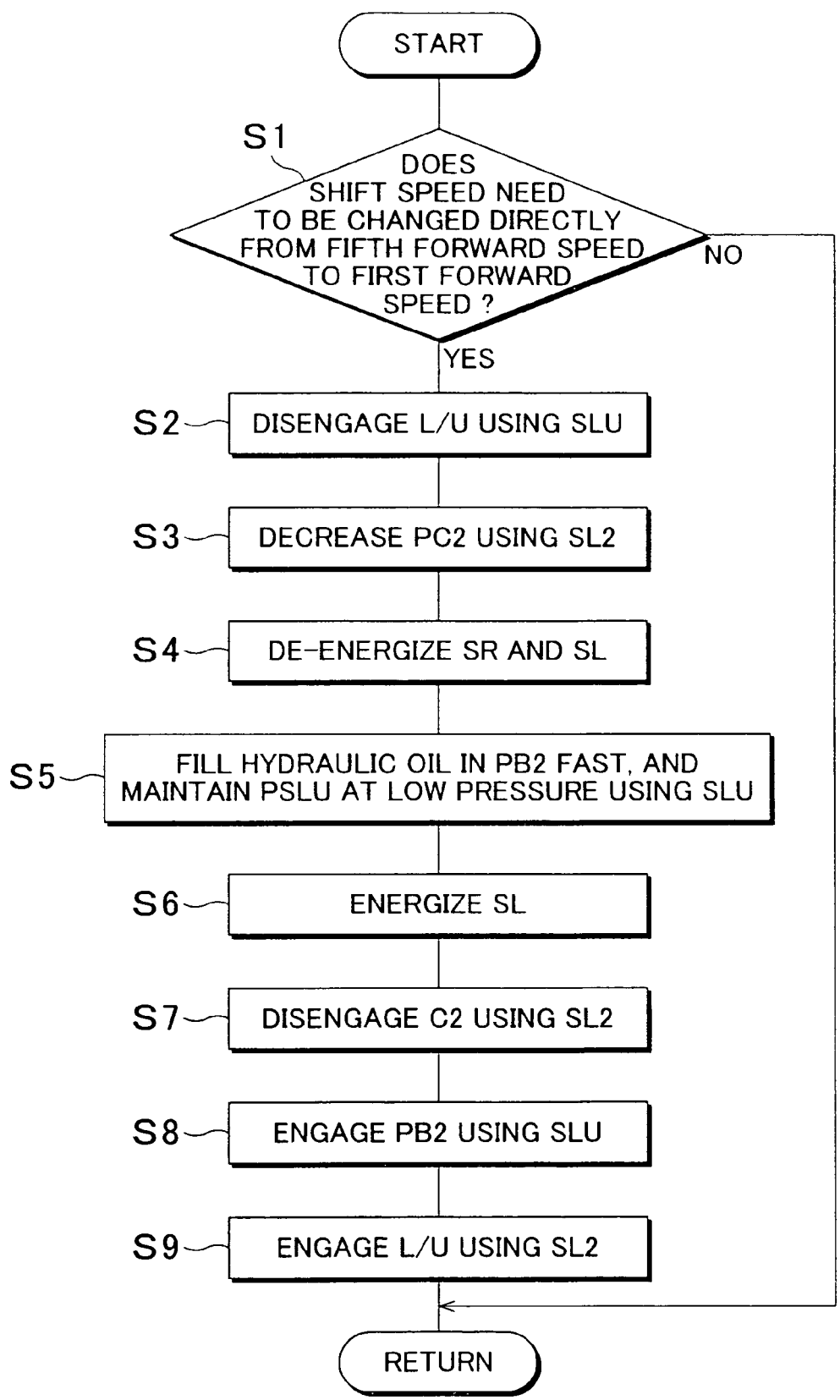
FIG. 15 illustrates a flowchart explaining a control that is executed in the case where the downshifting operation is performed to shift the fifth forward speed to the first forward speed in the automatic transmission in FIG. 1.
Figure 16:
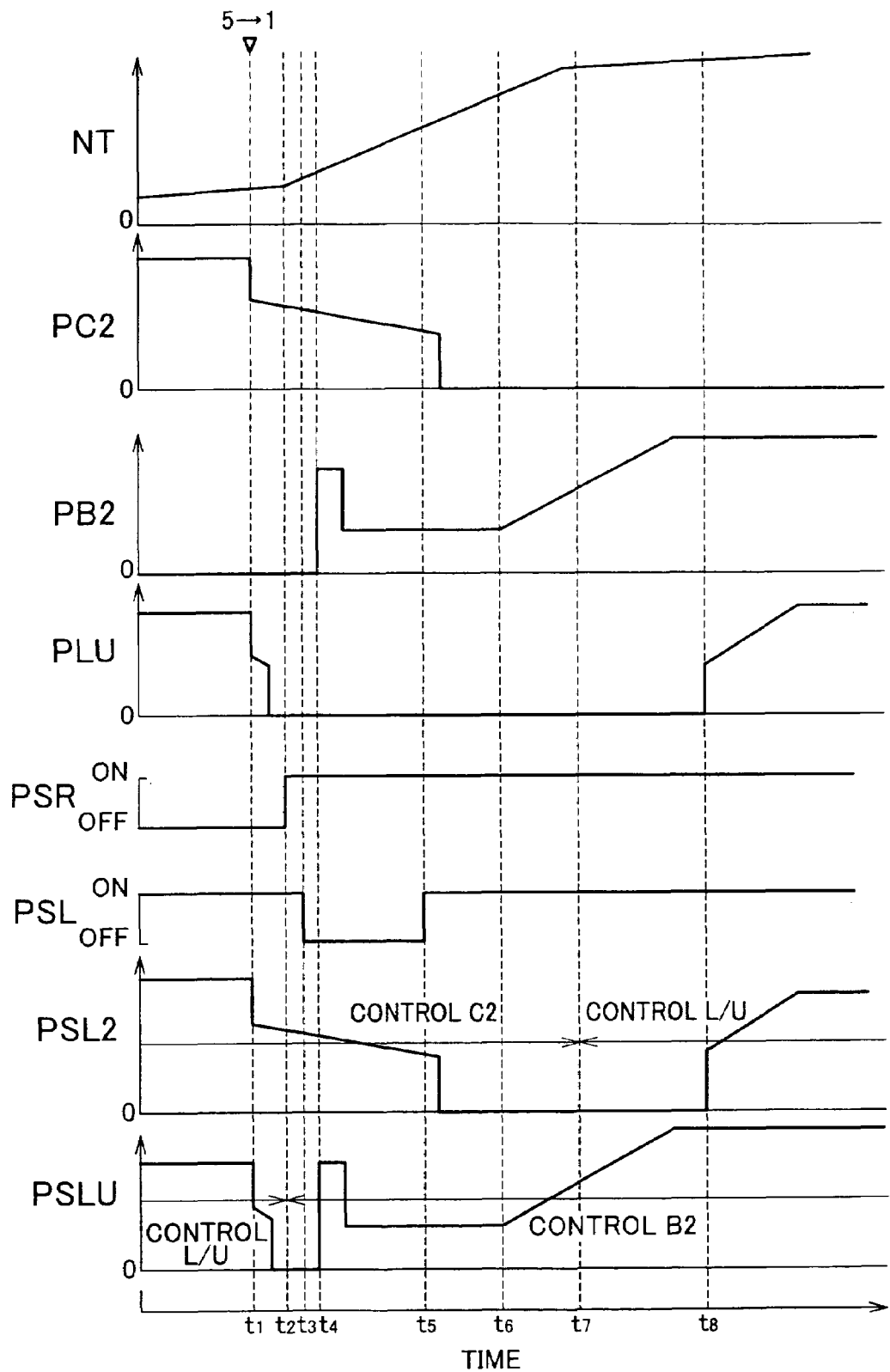
FIG. 16 illustrates an example of a time chart explaining changes in the hydraulic pressure and the like in components in the case where the downshifting operation is performed to shift the fifth forward speed to the first shift speed according to the flowchart in FIG. 15.

FIG. 15 illustrates a flowchart explaining signal processing that is executed by the electronic control unit 90 when the shift speed is changed directly from the fifth forward speed to the first forward speed when the lock-up clutch L/U is engaged, that is, in the case where the operating state of the hydraulic control circuit is changed from the operating state shown in FIG. 10 to the operating state shown in FIG. 12. FIG. 16 illustrates a time chart in this case. In FIG. 16, each hydraulic pressure corresponds to a command value. There is a certain time lag between a change in the command value and a change in the actual hydraulic pressure. The actual hydraulic pressure gradually changes.

In step S1 in FIG. 15, it is determined whether the shift speed needs to be changed directly from the fifth forward speed to the first forward speed, based on the shift map or the like. When it is determined that the shift speed needs to be changed directly from the fifth forward speed to the first forward speed, step S2 and subsequent steps are performed. In step S2, the linear solenoid valve SLU shown in FIG. 10 decreases the first control hydraulic pressure PSLU as shown in FIG. 16, thereby quickly disengaging the lock-up clutch L/U. In step S3, the linear solenoid valve SL2 decreases the second control hydraulic pressure PSL2 in a predetermined change pattern (i.e., at a predetermined changing rate), thereby gradually decreasing the engagement pressure PC2 of the second clutch C2. When the second clutch C2 starts to slip due to the decrease in the engagement pressure PC2, the turbine rotational speed NT starts to increase. In FIG. 16, the shifting control in steps S2 and S3 is started at time point $t_1$ in the case where it is determined that the shift speed needs to be changed from the fifth forward speed to the first forward speed.

After the lock-up clutch L/U is disengaged in step S2, both of the ON-OFF solenoid valves SR and SL are de-energized in step S4 at a predetermined time point. As a result, the signal pressure PSR is output, and output of the signal pressure PSL is stopped. In FIG. 16, the signal pressure PSR starts to be output at time point $t_2$. As a result, the state of the first relay valve 100 is changed as shown in FIG. 12, and the control of the engagement pressure PB2 of the second brake B2 is enabled. Output of the signal pressure PSL is stopped at time point $t_3$. As a result, the oil passage in the L/U relay valve 114 is switched so that the control of engagement of the lock-up clutch L/U is disabled.

In step S5, the linear solenoid valve SLU starts to control the first control hydraulic pressure PSLU at a time point that is determined in advance based on a change in the turbine rotational speed NT, an elapsed time since the start of the shifting control (time point $t_1$), and the like. By changing the first control hydraulic pressure PSLU in a predetermined pattern, the hydraulic oil is filled in the second brake B2 fast, and then the first control hydraulic pressure PSLU supplied to the second brake B2 is maintained at a predetermined low pressure, which does not generate engaging torque in the second brake B2. The process in step S5 is started at time point $t_4$.

In step S6, the ON-OFF solenoid valve SL is energized to output the signal pressure PSL at a time point that is determined in advance based on a change in the turbine rotational speed NT, an elapsed time since the start of the shifting control (time point $t_1$), and the like. In FIG. 16, the signal pressure PSL is output by the control in step S6 at time point $t_5$. As a result, the oil passage in the L/U relay valve 114 is switched so that the control of engagement of the lock-up clutch U/L is enabled. However, because the first control hydraulic pressure PSLU is maintained at the predetermined low pressure, the second relay valve 110 is maintained in a state where the second control hydraulic pressure PSL2 is supplied to the second clutch C2 irrespective of the signal pressure PSL.

In step S7, output of the second control hydraulic pressure PSL2 from the linear solenoid valve SL2 ceases so that the second clutch C2 is disengaged at a time point that is determined in advance based on a change in the turbine rotational speed NT, an elapsed time since the start of the shifting control (time point $t_1$), and the like. In step S8, the linear solenoid valve SLU increases the first control hydraulic pressure PSLU to engage the second brake B2 at a time point that is determined in advance based on a change in the turbine rotational speed NT, an elapsed time since the start of the shifting control (time point $t_1$), and the like. In FIG. 16, the process in step S7 is started at time point $t_6$. While the first control hydraulic pressure PSLU is increasing, the oil passage in the second relay valve 110 is switched as shown in FIG. 12. As a result, the torque capacity of the lock-up clutch LIU can be controlled by the second control hydraulic pressure PSL2 output from the linear solenoid valve SL2. In FIG. 16, the oil passage in the second relay valve 110 is switched at time point $t_7$. In the embodiment, the oil passage in the second relay valve 110 is switched when the first control hydraulic pressure PSLU has reached a pressure level at which the second brake B2 is completely engaged, and the shifting operation to change the shift speed from the fifth forward speed to the first forward speed is finished.

Subsequently, when a predetermined condition is satisfied, the torque capacity of the lock-up clutch L/U is controlled using the linear solenoid valve SL2 to engage the lock-up clutch L/U in step S9. In FIG. 16, the control of the torque capacity of the lock-up clutch L/U in step S9 is started at time point $t_8$.

In the embodiment, when the first control hydraulic pressure PSLU supplied to the second brake B2 is maintained at the low pressure by the linear solenoid valve SLU, the second relay valve 110 is maintained in a state where the second control hydraulic pressure PSL2 output from the linear solenoid valve SL2 is supplied to the second clutch C2. Then, when the first control hydraulic pressure PSLU output from the linear solenoid valve SLU increases the engagement pressure of PB2 of the second brake B2, the oil passage in the second relay valve 110 is switched so that the second control hydraulic pressure PSL2 output from the linear solenoid valve SL2 is supplied to the lock-up clutch L/U. Therefore, downshifting from the fifth forward speed to the first forward speed may be performed such that both of the second clutch C2 and the second brake B2 are maintained in the engaged state for a certain period of time. As a result, good shift response can be provided, and the shifting operation is appropriately performed while preventing shift shock.

Figure 17:
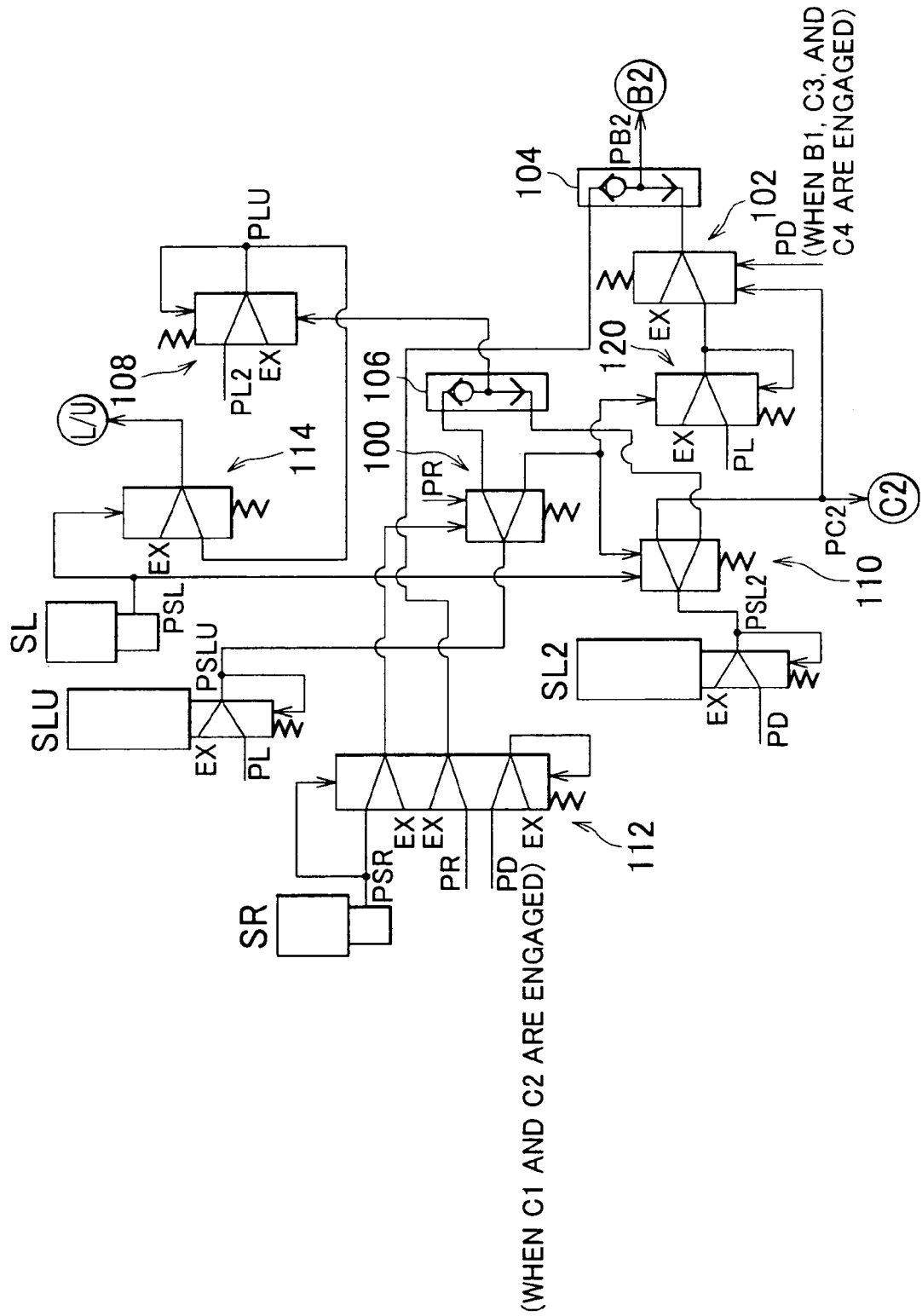
FIG. 17 illustrates a circuit diagram equivalent to FIG. 5, which shows another embodiment of the invention.

In the aforementioned embodiment, the first control hydraulic pressure PSLU output from the linear solenoid valve SLU is directly supplied to a hydraulic actuator for the second brake B2 to engage the second brake B2. However, as shown in FIG. 17, a B2 control valve 120 may be provided between the first relay valve 100 and the cut-off valve 102. In this case, the B2 control valve 120 regulates the line hydraulic pressure PL according to the first control hydraulic pressure PSLU and supplies the line hydraulic pressure PL to the hydraulic actuator for the second brake B2. The B2 control valve 120 may be provided between the cut-off valve 102 and the first check valve 104. In this case, the control valve regulates the line hydraulic pressure PL and the like using the control hydraulic pressures output from the linear solenoid valves SL1 to SL5 as the signal pressures, and supplies the line hydraulic pressure PL and the like to the hydraulic actuators for the frictional engagement devices C1 to C4, and B1.

While the invention has been described with reference to exemplary embodiments thereof, is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A hydraulic control apparatus for an automatic transmission which includes a hydraulic power transmission device with a lock-up clutch, and in which a plurality of hydraulic engagement devices are selectively engaged to achieve any one of a plurality of shift speeds which have different speed ratios, the hydraulic control apparatus comprising:

a first solenoid valve that controls an engagement pressure of a first engagement device that is engaged at a first predetermined shift speed, and that is disengaged at a second predetermined shift speed;

a second solenoid valve that controls an engagement pressure of a second engagement device that is disengaged at the first predetermined shift speed, and that is engaged at the second predetermined shift speed; and at least one oil-passage selection device which selects between a first oil passage used to control an engagement pressure of the first engagement device and a second oil passage used to control a torque capacity of the lock-up clutch, and supplies a first control hydraulic pressure output from the first solenoid valve to the selected oil passage, and which selects between a third oil passage used to control an engagement pressure of the second engagement device and the second oil passage, and supplies a second control hydraulic pressure output from the second solenoid valve to the selected oil passage.

2. The hydraulic control apparatus for the automatic transmission according to claim 1, wherein:

the oil-passage selection device includes a first relay valve that selects between the first oil passage and the second oil passage, and supplies the first control hydraulic pressure output from the first solenoid valve to the selected oil passage; and a second relay valve that selects between the third oil passage and the second oil passage, and supplies the second control hydraulic pressure output from the second solenoid valve to the selected oil passage; and the second relay valve selects the second oil passage, and supplies the second control hydraulic pressure to the second oil passage when the engagement pressure of the first engagement device or a hydraulic pressure corresponding to the engagement pressure of the first engagement device is input to the second relay valve as a signal pressure, and the engagement pressure of the first engagement device reaches a first predetermined pressure.

3. The hydraulic control apparatus for the automatic transmission according to claim 2, wherein:

the second oil passage includes a fourth oil passage to which the first control hydraulic pressure output from the first relay valve is supplied, and a fifth oil passage to which the second control hydraulic pressure output from the second relay valve is supplied.

4. The hydraulic control apparatus for the automatic transmission according to claim 2, wherein:

in a case where the shift speed is changed from the second predetermined shift speed to the first predetermined shift speed, the first control hydraulic pressure is controlled to decrease the torque capacity of the lock-up clutch while the second control hydraulic pressure is controlled to maintain the second engagement device in the engaged state;

after the torque capacity decreases, the first relay valve selects the first oil passage and supplies the first control hydraulic pressure to the first oil passage, and the first control hydraulic pressure is controlled to maintain the engagement pressure of the first engagement device at a second predetermined pressure or lower;

the second control hydraulic pressure is controlled to decrease the engagement pressure of the second engagement device to a third predetermined pressure or lower while the engagement pressure of the first engagement device is maintained at the second predetermined pressure or lower; and the first control hydraulic pressure is controlled to increase the engagement pressure of the first engagement device, and the second relay valve selects the second oil passage and supplies the second control hydraulic pressure to the second oil passage.

5. The hydraulic control apparatus for the automatic transmission according to claim 4, wherein engagement torque is not generated in the first engagement device when the engagement pressure of the first engagement device is equal to the second predetermined pressure, and engagement torque is not generated in the second engagement device when the engagement pressure of the second engagement device is equal to the third predetermined pressure.

6. The hydraulic control apparatus for the automatic transmission according to claim 4, wherein after the engagement pressure of the second engagement device decreases to the third predetermined pressure or lower, the first control hydraulic pressure is controlled to increase the engagement pressure of the first engagement device, and the second relay valve selects the second oil passage and supplies the second control hydraulic pressure to the second oil passage.

7. A hydraulic control method for an automatic transmission which includes a hydraulic power transmission device with a lock-up clutch, and in which a plurality of hydraulic engagement devices are selectively engaged to achieve any one of a plurality of shift speeds which have different speed ratios, the method comprising:

selecting between a first oil passage used to control an engagement pressure of a first engagement device and a second oil passage used to control a torque capacity of the lock-up clutch, and supplying a first control hydraulic pressure output from a first solenoid valve to the selected oil passage, wherein the first solenoid valve controls the engagement pressure of the first engagement device that is engaged at a first predetermined shift speed, and that is disengaged at a second predetermined shift speed; and selecting between a third oil passage used to control an engagement pressure of a second engagement device and the second oil passage, and supplying a second control hydraulic pressure output from a second solenoid valve to the selected oil passage, wherein the second solenoid valve controls the engagement pressure of the second engagement device that is disengaged at the first predetermined shift speed, and that is engaged at the second predetermined shift speed.

8. The hydraulic control method according to claim 7, wherein:

in a case where the shift speed is changed from the first predetermined shift speed to the second predetermined shift speed, the first engagement device is disengaged, the first control hydraulic pressure output from the first solenoid valve is supplied to the second oil passage, and the second control hydraulic pressure output from the second solenoid valve is supplied to the third oil passage; and in a case where the shift speed is changed from the second predetermined shift speed to the first predetermined shift speed, the second engagement device is disengaged, the second control hydraulic pressure output from the second solenoid valve is supplied to the second oil passage, and the first control hydraulic pressure output from the first solenoid valve is supplied to the first oil passage.

* * * * *